United States Patent
Hu

(10) Patent No.: US 12,530,684 B2
(45) Date of Patent: Jan. 20, 2026

(54) METHOD AND PLATFORM FOR CREATING NON-FUNGIBLE TOKENS WITH BUILT-IN TERMS

(71) Applicant: George Shiping Hu, Lexington, MA (US)

(72) Inventor: George Shiping Hu, Lexington, MA (US)

( * ) Notice: Subject to any disclaimer, the term of this patent is extended or adjusted under 35 U.S.C. 154(b) by 29 days.

(21) Appl. No.: 18/538,872

(22) Filed: Dec. 13, 2023

(65) Prior Publication Data

US 2024/0202721 A1  Jun. 20, 2024

Related U.S. Application Data

(60) Provisional application No. 63/439,616, filed on Jan. 18, 2023, provisional application No. 63/433,184, filed on Dec. 16, 2022.

(51) Int. Cl.
  *G06Q 20/40* (2012.01)
  *G06Q 20/36* (2012.01)
  *G06Q 20/38* (2012.01)

(52) U.S. Cl.
  CPC ........... *G06Q 20/401* (2013.01); *G06Q 20/36* (2013.01); *G06Q 20/389* (2013.01)

(58) Field of Classification Search
  None
  See application file for complete search history.

(56) References Cited

U.S. PATENT DOCUMENTS

| | | | | |
|---|---|---|---|---|
| 11,075,891 B1* | 7/2021 | Long | | H04L 9/3213 |
| 2022/0069996 A1* | 3/2022 | Xue | | H04L 9/3297 |
| 2022/0173893 A1* | 6/2022 | Basu | | H04L 9/3247 |
| 2022/0210061 A1* | 6/2022 | Simu | | H04L 9/3239 |
| 2022/0294630 A1* | 9/2022 | Collen | | H04L 9/3213 |
| 2022/0309491 A1* | 9/2022 | Shapiro | | G06F 21/64 |
| 2022/0355208 A1* | 11/2022 | Stephens | | A63F 13/335 |
| 2022/0392005 A1* | 12/2022 | Goldstraj | | G06Q 50/188 |
| 2023/0186262 A1* | 6/2023 | Busch | | G06F 21/1065 |
| | | | | 705/51 |
| 2023/0419283 A1* | 12/2023 | Le | | G06Q 30/04 |

FOREIGN PATENT DOCUMENTS

| | | | |
|---|---|---|---|
| WO | WO-2019213700 A1 | * | 11/2019 |
| WO | WO-2024063191 A1 | * | 3/2024 |

OTHER PUBLICATIONS

WO-2024063191-A1 machine translation (Year: 2024).*
International Search Report and Written Opinion of the International Search Authority mailed Apr. 3, 2024 in International Application No. PCT/US2023/083833 (9 pp.).

* cited by examiner

*Primary Examiner* — Paul S Schwarzenberg
(74) *Attorney, Agent, or Firm* — Crowell & Moring LLP

(57) ABSTRACT

A method performed by an NFT platform includes generating NFT secondary file information relating to a digital file and the NFT, wherein the NFT secondary file information comprises a content ID of the digital file stored in a data storage, wherein the data storage is a permanent and immutable data storage. The method may also include the NFT platform generating an NFT metadata file comprising the content ID of the digital file stored in the data storage, storing the NFT metadata file and the NFT secondary file information in the data storage, generating a smart contract of the NFT comprising a link to a content ID of the NFT metadata file stored in the data storage, and deploying the smart contact to a distributed ledger system.

20 Claims, 7 Drawing Sheets

METHOD AND PLATFORM FOR CREATING NON-FUNGIBLE TOKENS WITH BUILT-IN TERMS

CROSS-REFERENCE TO RELATED APPLICATIONS

This application claims the benefit of U.S. Provisional Application No. 63/433,184, filed Dec. 16, 2022, and U.S. Provisional Application No. 63/439,616, filed Jan. 18, 2023, the entirety of each of which are hereby fully incorporated by reference herein.

FIELD

This application generally relates to creating and using non-fungible tokens (NFTs) including secondary file information such as, for example, NFT terms.

BACKGROUND

Blockchain based crypto tokens, be they fungible tokens or non-fungible tokens (NFTs), are abstractions of the balances of ledger entries associated with each account (or address) in a distributed ledger system, that is, the blockchain. Fungible tokens such as Bitcoin and Ethereum derive their value from consensus and utilities, without needing any external asset backup. Compared with the Bitcoin blockchain, the Ethereum blockchain is equipped with a Turing-complete programming language, and it is capable of more than creating its native token Ethereum. Smart contracts—lines of codes with their own logic—which could be deployed on the blockchain by anyone, are capable of creating subsets of crypto tokens besides the Ethereum token. Depending on the token standard used, those smart contract-created tokens can be fungible tokens (e.g., standard ERC-20) with a total supply of more than 1, or non-fungible tokens (NFTs) (e.g., standard ERC-721) with a total supply of exactly 1, or a total supply of more than 1 but each token having a unique smart contract and Token ID pair. What is special about an NFT is that the smart contract links an NFT to something unique, thus making the NFT a representation of that unique thing, such as a piece of digital art, a membership, an event ticket with assigned seat, and so on. The value of an NFT, therefore, is derived from the value of the unique thing that it represents.

For a blockchain network to be secure, it needs to run on many computers (nodes). More nodes lead to more decentralization and security. For that reason, a blockchain is not capable of storing large amounts of data. For instance, in 2022, the Ethereum blockchain's fully synced data size is 890 GB even without putting any NFT related digital artwork on chain. This will continue to grow with more applications built on the chain and more transactions taking place every day. When the blockchain data gets too big, many node runners may not be able to continue running due to constraints of available computer hardware. Furthermore, more data stored on chain means it is more expensive for the user as it demands more computing resources. Therefore, the underlying assets to which NFTs link or represent are typically stored on a central server, or on a public decentralized file storage system such as IPFS (InterPlanetary File System), StorX, Arweave, or Filecoin. Typically, the link between an NFT and its underlying asset is established by the NFT pointing to a URL weblink where the asset is stored. In other words, NFT owners have their NFTs on a blockchain (which show up in their crypto wallets), while the underlying assets are located somewhere else off chain. This in itself is not a problem, and is similar to a situation where an individual owns a painting, but the painting is located at an off-site storage location rather than at their home.

Blockchain technology has enabled records of ownership and transaction history of digital assets on distributed, immutable ledgers. In various examples, when a creator creates a piece of unique digital asset (e.g., digital art, photography, videos, music, etc.), the unique digital asset can be represented by a non-fungible token (NFT) on a blockchain. For a non-creator to own such an NFT, they would purchase it from its current owner, executing a purchase/sales transaction on the blockchain. While blockchains provide perfect immutable records of all NFT transactions, currently, at least two major structural issues exist with respect to what exactly an NFT represents. Both issues are related to the present technical construction of NFTs and/or how they are technically constructed.

A first technical issue is that an NFT owner's rights to the underlying assets may not be clear. Despite someone's ownership of an NFT (as is evident from his crypto wallet showing the NFT), their relationship with the underlying asset may be dictated by terms not in his possession. This may be due to a combination of reasons. For example, the "terms" between the NFT seller and buyer, which are usually hosted on the creator's platform or on an NFT marketplace trading platform, is exogenous to, extrinsic from, or otherwise separate from the NFT. Additionally, the "terms" can be unilaterally changed by the NFT creator, sometimes even without any effective means of notifying the new NFT owner. Additionally, the "terms" may be unclear as to whether the NFT buyer owns rights (e.g., the copyright or other intellectual property rights) to the underlying asset, or simply owns or holds a license to the underlying asset. These are technical structural problems due to the terms being exogenous to the NFT itself.

A second issue is that the NFT smart contract owner (typically the NFT creator) can change the entire metadata underpinning the NFT by changing, for example, the baseURI or TokenURI on the blockchain, thereby making the NFT point to something different than to which it originally pointed. For example, the link in the NFT smart contract that points to the NFT metadata (e.g., the baseURI or TokenURI) can often be changed by the smart contract owner (usually the NFT creator) after the NFT has been minted. Unless the creator voluntarily revokes his ownership of the smart contract, or has the TokenURI "baked in" the smart contract, the possibility of metadata being changed after an NFT being sold cannot be ruled out. For example, an NFT buyer could one day find out that his NFT points to some metadata that is different from what he originally bought the NFT for because the NFT smart contract owner had changed the baseURI after he bought the NFT. This is also a structural problem, and it is due to the mutability of an NFT's link to its metadata. This lack of clarity in NFT owners' copyright/IP right ownership and the mutability of NFTs' metadata not only hinder the many potential use cases for NFTs and their wider adoption, but also open the door for bad actors. Solutions to these two problems are presented herein.

SUMMARY

In accordance with various embodiments disclosed herein, a new type of NFT protocol and NFT structure (e.g., the "ACKCS" (pronounced "Access") Protocol) is disclosed. Additionally, a marketplace (ACKCS.io) built on top of this new NFT protocol and structure is disclosed. The new protocol provides technical solutions to the structural issues identified above with respect to the "terms" of an NFT being exogenous to the NFT itself, and the mutability of an NFT's link to its metadata. Additionally, the new NFT protocol eliminates rights ownership confusion surrounding the NFT. The new NFT protocol achieves these goals by enabling NFT creators to build customized NFT terms directly into their NFTs, thereby linking such terms directly to the NFT itself. In various embodiments, the NFT terms are stored on a public network, and are transparent and immutable. After an NFT's creation and for every future transaction involving the NFT, the NFT will automatically carry the terms with it, without its owner or any new owner-to-be, needing to worry about any uncertainties regarding what exactly he owns, nor the need to worry about potential bad actors changing the NFT metadata on the blockchain. As disclosed is technology to encrypt and decrypt the underlying assets of certain NFTs when public access to the assets is not desired. As such, the protocol enables streaming services for artwork, music, movies, and videos, software licensing, event ticketing, and physical assets tokenization and trading, all through NFT transactions, where settlement is peer-to-peer, immediate, immutable, and transparent on the blockchain.

In some exemplary implementations, a method performed by an NFT platform includes generating NFT secondary file information relating to a digital file and the NFT, wherein the NFT secondary file information comprises a content ID of the digital file stored in a data storage, wherein the data storage is a permanent and immutable data storage. The method may also include the NFT platform generating an NFT metadata file comprising the content ID of the digital file stored in the data storage, storing the NFT metadata file and the NFT secondary file information in the data storage, generating a smart contract of the NFT comprising a link to a content ID of the NFT metadata file stored in the data storage, and deploying the smart contact to a distributed ledger system.

In some exemplary implementations, which may be combined with any of the other exemplary implementations disclosed herein, the method includes the NFT platform storing the NFT secondary file information in an NFT secondary file information file that is a separate file from the NFT metadata file, wherein the NFT metadata file comprises a content ID of the digital file and a content ID of the NFT secondary file information file. Alternatively or additionally, the method may include the NFT platform storing the NFT secondary file information in the NFT metadata file. In various embodiments, the NFT secondary file information also includes at least one of a description of the NFT, a smart contract owner wallet address, an NFT timestamp, NFT terms, and/or an NFT platform stamp or serial number. In some embodiments, the permeant and immutable data storage is a public decentralized storage system, which may be an InterPlanetary File System (IPFS). In some embodiments, the digital file is at least one of an image file, an audio file, a video file, a document file, an application, or a software key.

In some exemplary implementations, which may be combined with any of the other exemplary implementations disclosed herein, the method includes the NFT platform receiving the digital file, and storing the digital file in the data storage. In other embodiments, the method includes the NFT platform receiving selections of template NFT terms, and generating the NFT secondary file information based at least in part on the selections. In some embodiments, the NFT secondary file information also includes an NFT platform stamp or serial number.

In some exemplary implementations, which may be combined with any of the other exemplary implementations disclosed herein, the method includes the NFT platform receiving an indicated date or NFT TokenID number after which at least one of the NFT metadata file, the NFT secondary file information, or the digital file is to be changed. The method may also include the NFP platform generating updated NFT secondary file information relating to the digital file or an updated digital file, wherein the updated NFT secondary file information comprises the content ID of the digital file or an updated content ID of an updated digital file. The method may also include the NFT platform generating an updated NFT metadata file comprising the content ID of the digital file or the updated content ID of the updated digital file, storing the updated NFT metadata file and the updated NFT secondary file information in the data storage, and causing the smart contract of the NFT to include a link to an updated content ID of the updated NFT metadata file.

In some exemplary implementations, which may be combined with any of the other exemplary implementations disclosed herein, wherein the digital file is a first digital file, the method includes the NFT platform encrypting a content ID of a second digital file stored in the data storage to form an encrypted content ID, wherein the second digital file is related to the first digital file, and generating the NFT metadata file comprising the encrypted content ID of the second digital file. In various embodiments, the first digital file is at least one of a lower resolution version of the second digital file, an incomplete portion of the second digital file, and/or an image corresponding to the second digital file when the second digital file is a video file or an audio file. In various embodiments, encrypting the content ID of the second digital file to form the encrypted content ID may include the NFT platform encrypting the content ID of the second digital file using a cryptographic key of an issuer of the NFT and a cryptographic key of the NFT platform. In various embodiments, the method may include the NFT platform generating the NFT secondary file information comprising the encrypted content ID of the second digital file. In some embodiments, encrypting the content ID of the second digital file to form the encrypted content ID comprises the NFT platform encrypting the content ID of the second digital file using a cryptographic key of a streaming user of the second digital file and a cryptographic key of the NFT platform. In some embodiments, the method may include the NFT platform decrypting the encrypted content ID of the second digital file stored in the data storage using the cryptographic key of the streaming user and the cryptographic key of the NFT platform, retrieving the second digital file from the data storage, and streaming the second digital file to the streaming user.

In some exemplary implementations, which may be combined with any of the other exemplary implementations disclosed herein, the NFT represents a license to use a software application, and the method includes the NFT platform generating the smart contract comprising an NFT expiration time and instructions for the NFT to self-destruct upon reaching the expiration time.

In some exemplary implementations, which may be combined with any of the other exemplary implementations disclosed herein, the method includes the NFT platform generating a code corresponding to the NFT at a time of minting the NFT, the code representing an address of the smart contract and a token ID of the NFT. The method may also include a first mobile device presenting the code and information corresponding to a wallet address of a present holder of the NFT, a second mobile device scanning the code presented by the first mobile device and the information corresponding to the wallet address of the present holder of the NFT, and determining that the address of the smart contract, the token ID of the NFT, and the information corresponding to the wallet address of the present holder of the NFT match data on the distributed ledger system. In various embodiments, the method may include the NFT platform encrypting the content ID of the digital file to form an encrypted content ID using a cryptographic key of the NFT platform.

DETAILED DESCRIPTION

In accordance with various embodiments disclosed herein, a new type of NFT protocol and NFT structure is disclosed. The new NFT protocol addresses the above identified technical problems by linking terms directly to an NFT, and by ensuring the link to the metadata associated with the NFT is stored in an immutable manner so that it cannot be altered by bad actors or mistakenly.

Figure 1:
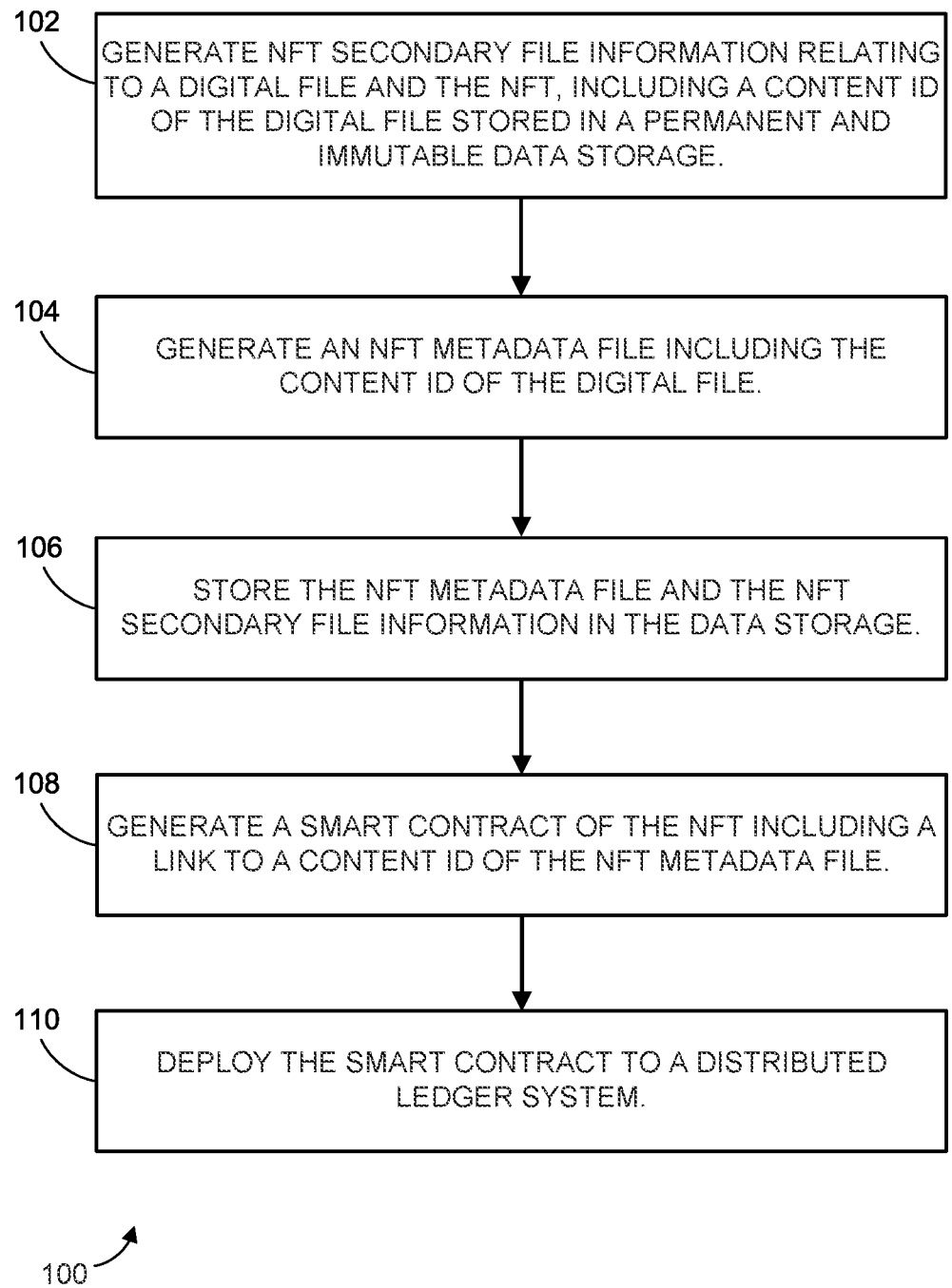
FIG. 1 shows a flow diagram illustrating a method in accordance with various embodiments.

FIG. 1 shows a flow diagram illustrating a method 100 for creating an NFT in accordance with various embodiments disclosed herein. The steps of the method 100 disclosed in the flow diagram may be performed, for example, by an NFT platform, which may include one or more computing devices and/or servers, discussed further below, and may represent the general approach to creating NFTs in accordance with the various embodiments disclosed herein. At step 102, the NFT platform may generate NFT secondary file information relating to a digital file and the NFT. In various embodiments, the digital file may be the underlying digital asset (or a version of the underlying digital asset) of the NFT. The digital file may be at least one of an image file, an audio file, a video file, a document file, an application, or a software key, or any other digital asset. In various embodiments, the NFT secondary file information may be an information file that includes a content ID of the digital file stored in a data storage. In various embodiments, the data storage is a permanent and immutable data storage (e.g., via a public decentralized file storage systems such as IPFS). In various embodiments, the NFT secondary file information may also include, for example, information regarding the NFT such as a description of the NFT, a smart contract owner wallet address, an NFT timestamp, NFT terms, and/or an NFT platform stamp or serial number. Example NFT terms may dictate ownership and/or licensing rights or other contractual rights established with respect to the NFT. The NFT secondary file information may be a PDF file, and image file, or a text file or other file type that may include text corresponding to the above description.

At step 104, the NFT platform may generate an NFT metadata file comprising the content ID of the digital file stored in the data storage. In various examples, this NFT metadata file may be a JavaScript Object Notation (JSON) metadata file, which includes notation code or other text relevant to the NFT. In particular, as stated above, the NFT metadata file may include the content ID of the digital file stored in the data storage.

At step 106, the NFT platform may store the NFT metadata file and/or the NFT secondary file information in the data storage. Again, in various embodiments, the data storage is permanent and immutable, such as a public file storage systems such as IPFS.

At step 108, the NFT platform may generate a smart contract of the NFT including a link to a content ID of the NFT metadata file stored in the data storage. That is, the smart contract, and any NFT that is minted from it, will link to the content ID of the NFT metadata file that is stored on the data storage (e.g., stored on the permanent and immutable storage system, such as IPFS).

At step 110, the NFT platform may deploy the smart contact to a distributed ledger system. In various examples, wherein the distributed ledger system is an Ethereum blockchain, a Polygon blockchain, a Solana blockchain, or another smart contract blockchain. In certain examples, the smart contract is created in accordance with the ERC721 standard for the Ethereum blockchain, or equivalent or similar standards for other blockchains.

In accordance with this method 100, the new NFT protocol brings a solution to previously stated problems by creating an NFT with built-in terms that are expressly and immutably linked to the NFT. Specifically, once the digital file (e.g., the NFT Metadata File, which is the underlying digital file such as an image, music, video, etc.) is uploaded to the public storage system (e.g., IPFS), and its Content ID (CID) is established, the CID will be written in an NFT Description Section of the NFT secondary file information (e.g., the NFT Terms File), which may also in turn be uploaded to IPFS. The uploaded NFT Terms File will have an established CID of its own. Both the digital file CID and the NFT Terms File CID will be written in the NFT Metadata File (e.g., the NFT Metadata JSON file). The NFT Metadata JSON File may also be uploaded to the public storage system (e.g., IPFS), and its CID established. This NFT Metadata JSON file CID will be the baseURI or TokenURI written in the NFT Smart Contract when the smart contract is deployed on chain.

To further establish the NFT Terms File's authenticity, the NFT Terms File may contain the Smart Contract Owner (Creator) wallet address, an NFT Timestamp indicating the date when the NFT was created, and a unique Protocol Stamp/Serial Number.

Figure 2:
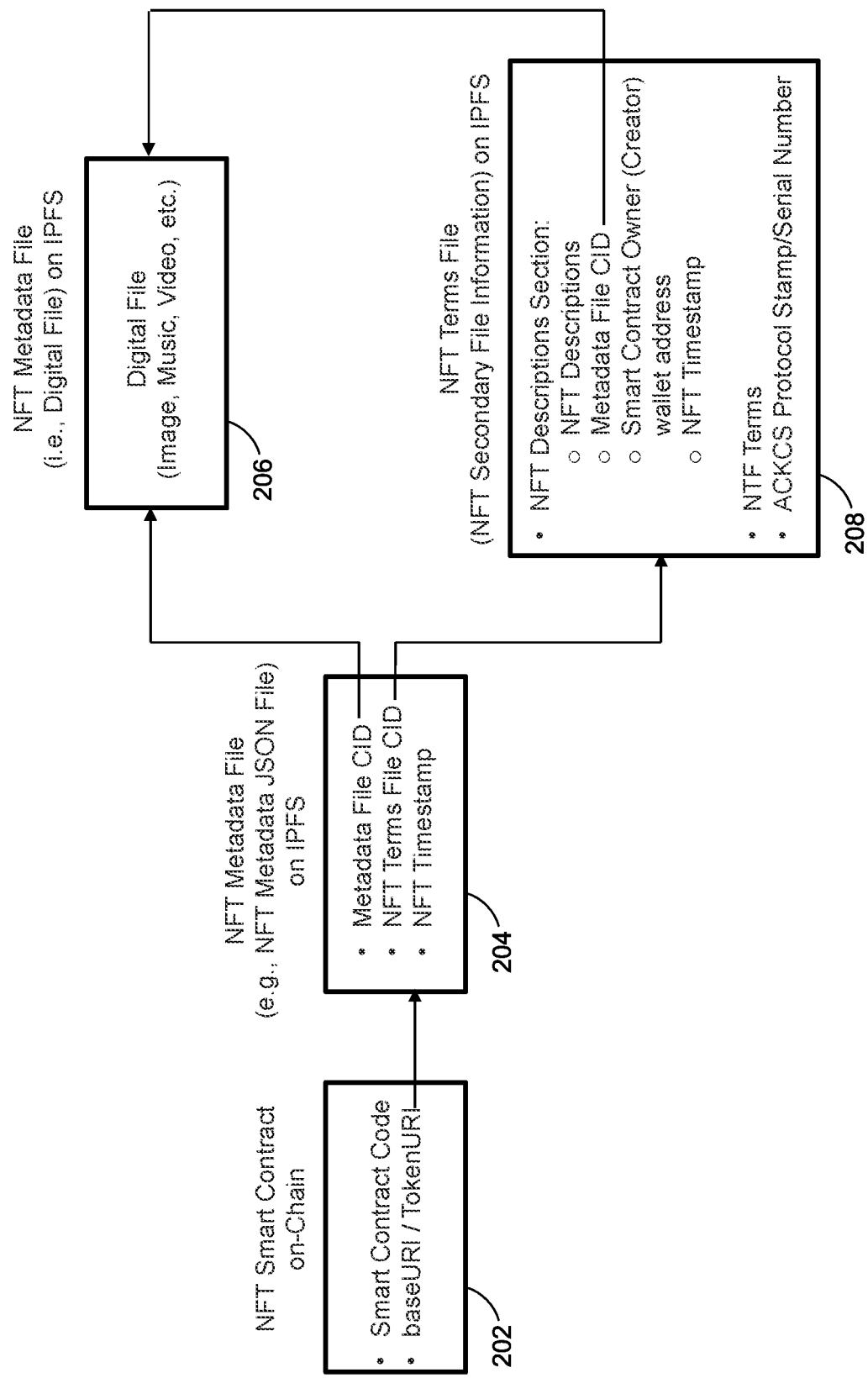
FIG. 2 shows a block diagram illustrating different data files in accordance with various embodiments.

FIG. 2 illustrates a block diagram showing the different data files in accordance with some embodiments (e.g., embodiments where the NFT secondary file information is stored in a separate file from the NFT metadata file). The NFT Smart Contract 202 is shown stored on a blockchain system. It includes at least the smart contract code and a baseURI or TokenURI that points to the NFT Metadata File (e.g., the NFT Metadata JSON File) 204. The NFT Metadata File (e.g., the NFT Metadata JSON File) 204 may be stored on the public storage system (e.g., IPFS) and may include at least the CID of the Digital File 206 (e.g., the Metadata File CID), and a CID of the NFT Terms File (e.g., the NFT Secondary File Information file) 208, and may include an NFT Timestamp. The NFT Secondary File Information file 208 (e.g., NFT Terms File) may be stored on the public storage system, and may include various information related to the NFT, including at least the CID of the Digital File 206. The NFT Secondary File Information file 208 (e.g., NFT Terms File) may also be stored on the public storage system, and may also include in an NFT description section NFT descriptions, smart contract owner (creator) wallet address, NFT Timestamp, NFT Terms, and a unique Protocol Stamp/Serial Number. The Digital File 206 may also be stored on the public storage system, and may include or be the underlying digital file.

The binding relationships between the NFT Metadata (JSON) file 204, the Digital File 206, and the NFT Terms File 208 are firmly established via the immutable CID of the files stored on the public data storage (e.g., the IPFS CIDs). The binding relationship between an NFT token and/or NFT smart contract 202 and its metadata and terms (files 204, 206, 208) is established by the NFT Smart Contract address, the Smart Contract Owner wallet address, and the NFT Timestamp, which are all transparent and immutable on the blockchain. The NFT Terms File 208, once stored, is immutable and can be accessed and viewed by the public. The NFT smart contract 202 that generates the NFT (or NFTs), links the NFT permanently to the terms file 208 stored on the public storage network, thus making the terms permanently part of the NFT's metadata, thereby surviving all the NFT's future transactions and changes of ownership, and therefore avoiding confusions as to exactly what rights the NFT represents for its owner.

In various embodiments, the NFTs are created with full terms in the NFT's metadata. The full terms may be written directly in the metadata file (e.g., the NFT Metadata JSON file 204), which in turn is stored in a public data storage network. In another example, the full terms may be written in a separate file than the NFT metadata file 204 (e.g., the NFT Terms File 208) that is stored either in a public data storage network, or stored in a private data storage network or private data server, but then the NFT's metadata file 204 provides a URL or weblink to the terms file, thus making the terms part of the NFT's metadata. In another example, the full terms may be written directly in the NFT metadata file 204, which in turn is stored in a private data storage network or private data server. In another example, the full terms are written in a separate file than the NFT metadata file 204 (e.g., the NFT Terms File 208) that is stored in a private data storage network or private data server, but then the NFT's metadata file 204 provides a URL or weblink to the legal terms file, thus making the legal terms part of the NFT's metadata. It is noted that private data storage networks or data servers are included in the alternative embodiments above, because some private data storage can also be permanent, or intended to be permanent, and immutable, or intended to be immutable.

Accordingly, in some embodiments, the method may further include the NFT platform storing the NFT secondary file information in an NFT secondary file information file that is a separate file from the NFT metadata file. In this approach, the NFT metadata file may include a content ID of the digital file, and a content ID of the NFT secondary file information file. However, in other embodiments, the method may include the NFT platform storing the NFT secondary file information in the NFT metadata file.

In various embodiments, a creator may upload the underlying digital asset directly to the NFT platform rather than to the data storage. The NFT platform may then perform the task of storing the digital asset to the permanent and immutable data store and receiving the CID of the digital file. As such, the method may include the NFT platform receiving the digital file (e.g., from a creator), and storing the digital file in the data storage.

In some embodiments, the method may include creation of an NFT collection. An NFT collection is a group of NFTs minted from a same smart contract. The creator of an NFT collection may have good reasons to update the NFT Metadata and/or NFT Terms at a certain point in time or a certain point after some NFTs have been minted and minting of other NFTs have not yet begun. For example, ticket NFTs with different tiers of seating arrangement. The new NFT Protocol may allow the creator to plan for the update of the NFT Metadata and/or the NFT Terms.

For example, the creator may specify a certain date and time, or a certain TokenID (e.g., after the 100th token) from the smart contract, after which the creator plans to update the NFT Metadata and/or the NFT Terms. The NFT platform, under the new NFT Protocol, may upload the updated Metadata File (e.g., the Digital File 206) to IPFS, and/or assemble the updated NFT Terms file 208, and upload the updated NFT Terms File 208 to IPFS. The updated Digital File 206 CID and updated NFT Terms File 208 CID, as well as the NFT Timestamp reflecting the update, may be recorded in the NFT Metadata (JSON) File 204. A Protocol Stamp/Serial Number may also be written in the NFT Terms File 208. This process does not affect the validity of the Metadata and Terms linked to the NFTs minted prior to the update, and validates the legitimacy of the updated Metadata and NFT Terms for the NFTs minted after the update.

As such, the method may include the NFT platform receiving an indicated date or NFT TokenID number after which at least one of the NFT metadata file, the NFT secondary file information, or the digital file is to be changed. The method may then include the NFT platform generating updated NFT secondary file information relating to the digital file or an updated digital file, wherein the updated NFT secondary file information comprises the content ID of the digital file or an updated content ID of an updated digital file. The method may also include the NFT platform generating an updated NFT metadata file comprising the content ID of the digital file or the updated content ID of the updated digital file, and storing the updated NFT metadata file and the updated NFT secondary file information in the data storage. The method may include the NFT platform causing the smart contract of the NFT to include a link to an updated content ID of the updated NFT metadata file.

The above disclosed methods results in the preservation of the binding between an NFT, its metadata, and its underlying digital asset, despite the fact that the link (TokenURI or baseURI) between the NFT and its metadata could be changed, for good reasons or bad. When the link between an NFT and its metadata (and digital asset) is changed for bad reasons, the disclosed method preserves, with tangible evidence, the binding relationship between the NFT and the legitimate metadata and underlying digital asset. For example, suppose a bad actor creates an NFT using the new NFT Protocol, sells it, but then changes the baseURI in the NFT smart contract 202 so that it points to some different terms that favor himself. Suppose the bad actor also uploads the NFT Digital File 206 to a different IPFS location (different CID) and he writes that different CID in the changed NFT Terms File 208. Furthermore, suppose he writes the original NFT Timestamp (which is on-chain and transparent) in both the Metadata JSON File 204 and the NFT Terms File 208 to make them look legitimate. Even so, the bad actor will not be able to obtain a legitimate ACKCS Protocol Stamp/Serial Number in his fake Terms File. The lack of a genuine ACKCS Protocol Stamp/Serial Number will prove that the changed baseURI is fake. When an NFT collection (that is, a group of NFTs minted from the same smart contract), the link (baseURI) between the NFT smart contract and its metadata (and digital assets) is changed for proper reasons, the disclosed method preserves, with tangible evidence, the binding relationship between the NFTs and their metadata and digital assets for the NFTs minted before the change (e.g., before a particular date or particular minted NFT number), and the binding relationship between the NFTs and their metadata and digital assets for the NFTs minted after the change.

Presently, when an NFT creator creates an NFT smart contract, they have the choice of either fixing the baseURI or TokenURI (the link that points to the NFT's metadata) in the smart contract, or keeping the link updatable. Creators often keep the baseURI updatable for good reasons. For instance, a creator may not want to reveal the actual metadata of his NFTs during an NFT pre-sale period, and may want to reveal the actual NFT metadata after the public mint period starts. That creator may achieve that by initially letting the baseURI point to some metadata that shows a generic image during the pre-sale period, and then when the public NFT mint starts, they may update the baseURI to point to the actual metadata. Another example of a good use of updatable baseURI is gaming NFTs, where changeable metadata may be a feature of the NFT.

Despite the benefits updatable NFT links and metadata bring to creators, for many NFT applications or potential applications, changeable metadata defeats the purpose of immutability that blockchain technology brings to the world. Currently, major NFT marketplaces such as Opensea attempts to solve this issue by "freezing" the NFT metadata. Opensea "freezes" metadata by taking a snapshot of the value of the baseURI (or TokenURI), and taking a snapshot of the URL it points to. Going forward, any on-chain changes to the baseURI value or to the pointed-to URL after the snapshots are simply ignored by Opensea. However, this does not fundamentally solve the problem because NFT owners now need to solely rely on Opensea's authority, without any tangible evidence, for the authenticity of their NFTs' metadata. The following problems can still occur.

In one problem example, Opensea "freezes" the metadata of an NFT. Someone buys the NFT, thinking that the metadata has been frozen so he would own the underlying asset the "frozen" metadata represents. But then the NFT creator, i.e., the NFT contract owner, changes the baseURI, which then points to something totally different from the frozen (snapshot) metadata shown on Opensea website. Then perhaps, out of curiosity, either the buyer himself, or somebody else, queries the on-chain baseURI with Etherscan, and finds out that the metadata of the NFT differs from what Opensea is showing. Now it is not clear what exactly the NFT represents.

In another problem example, an NFT gets listed on Opensea. Opensea "freezes" the metadata. The NFT contract owner makes a change to the baseURI which then points to something different. The NFT gets listed on another marketplace (say Rarible). Rarible queries the baseURI on-chain and gets the updated baseURI, therefore Rarible shows different metadata for the NFT. Now purchasers or new owners are confused as to what exactly the NFT represents.

The above described methods address these issues that are left unresolved in the prior art. In part, due to the permanent and immutable information stored in the various files according to the new NFT protocol, users are provided with tangible evidence for the authenticity of their NFTs and the linked metadata and underlying digital assets.

NFT Terms Creation

Because of the way an NFT is constructed, that is, an on-chain token pointing to a piece of digital asset located in a different off-chain place, the concept of NFT ownership is not clearly defined until the relationship between the NFT and the underlying asset is defined. Stated another way, the key to define NFT ownership is to establishing what "pointing to" means. In some examples, the NFT may point to a piece of digital asset as opposed to physical asset, and as such, there could easily be multiple copies of the same asset located in different places. Because an NFT derives its value, for the most part, from the underlying content it is linked to, the concept of owning an NFT alone without certain established rights to the underlying content would be meaningless. Being a new asset class and lacking well defined ownership concerning the underlying content, currently even the most high-profile NFTs have numerous issues and confusion between the NFTs issuers and owners. Additionally, different copyright laws in different jurisdictions certainly bring complications to marketplaces for NFTs, including representations of digital assets living on public blockchains open to the entire world. Because of the many exclusive rights attached to copyright ownership, and the ramifications of losing such ownership, for digital assets in particular, digital assets owners often prefer licensing their works to the end users instead of selling their ownership. This has been a standard practice for proprietary software for decades. For NFTs, however, due to their technical composition, distinction between ownership and licensing is in a confused state.

Currently, many of the top NFT collections generally fall into four categories of license agreements: Commercial Rights, where an NFT owner could monetize the underlying artwork freely; Limited Commercial Rights, where an NFT owner could monetize the artwork but with certain limit such as a cap on the revenue, limited formats or limited period of time; Personal Use Only, where an NFT owner has certain display rights but cannot monetize the artwork; or Creative Commons, where the artwork belongs to the public domain accessible to anybody.

For a potential NFT owner who plans to use an NFT, they derive value from the underlying asset for the most part. (There are exceptions, of course, for example, where the NFT also serves as a membership to certain organizations or groups, or represents a license to utilize a software application.) It is therefore important for an owner-to-be to understand what exactly they will own and what rights they will have when purchasing an NFT. A careful owner-to-be would study the NFT terms drafted by the NFT creator before making the purchase.

As an example, let's review one of the prominent NFT projects, the Bored Ape Yacht Club (BAYC), for its potential ownership issues. The project's website stated "BAYC is a collection of 10,000 Bored Ape NFTs—unique digital collectibles living on the Ethereum blockchain. Your Bored Ape doubles as your Yacht Club membership card, and grants access to members-only benefits." In the "Terms & Conditions" section, it stated that "You Own the NFT. Each Bored Ape is an NFT on the Ethereum blockchain. When you purchase an NFT, you own the underlying Bored Ape, the Art, completely." From reading this, an NFT purchaser might be under the impression that they would own the copyright of the underlying art ("completely"). However, the next section of the terms also states that "Yuga Labs LLC grants you a worldwide, royalty-free license to use, copy, and display the purchased Art, along with any extensions that you choose to create or use, solely for the following purposes . . . " As such, Yuga Labs is not really selling the copyright ownership of the underlying art of the NFT, because if they did, there would be no licensing to speak of.

Also reviewed are the terms of other NFT projects now also owned by Yuga Labs such as Cryptopunks and Meebits. In those terms, Yuga Labs made it clear that an NFT purchaser owns the NFT alone, but that Yuga Labs own the intellectual property and copyright of the art underlying the NFT; and they grant the NFT purchaser an exclusive license to the underlying art. However, Yuga Labs can unilaterally change the license terms, which are stated to be "legally binding agreement by and between Yuga Labs, Inc. and any owner of a Cryptopunk/Meetbit NFTs."

When the information given by BAYC/Yuga Labs is unpacked, the following questions come to one's mind: Does a purchaser of a BAYC NFT own the copyright of the underlying art of the NFT or not? The information given by the NFT seller, BAYC/Yuga Labs, seems to be self-conflicting.

From reading the BAYC terms, the overall impression seems to be that Yuga Labs' intent is to sell an NFT purchaser a club membership as well as a license to the art underlying the NFT while they retain the copyright ownership of the art. The 10,000 Bored Apes, look similar—they are all apes, aren't they—but each one is also unique; thus, each ape is represented by an NFT. But nowhere in the terms indicates whether the license sold to the purchaser is an exclusive license or not. Given that Yuga Labs could unilaterally change the license terms, even if the licenses are exclusive initially, how can an NFT owner be sure that the terms will not change down the road? Suppose the license gets changed to non-exclusive, which means Yuga Labs could sell licenses to the same "unique NFT art" to multiple purchasers. Consequently, the rarity an NFT owner purchased would no longer be rare after all. Though Yuga Labs' recent changes in their NFT terms have mitigated the ownership confusions for their NFT projects, similar confusions exist in many other NFT projects.

The license terms are hosted in a private company's website, the availability of which is not guaranteed. How can future NFT owners be sure what they are getting when they plan to buy an NFT without access to permanently available terms?

For a current NFT owner, even if they might have been careful enough to have read the original terms, they might not have saved a copy when initially purchasing the NFT. How could they know if the current terms, hosted in the creator's website, do not deviate significantly from the original terms, and their rights as agreed upon in the original terms are not compromised? In case of a law suit, where can they obtain a copy of the original terms as evidence?

As discussed above, and below, the new NFT Protocol and structure addresses these issues. Under the new NFT protocol, NFTs are created, transacted, and used, with built-in terms (e.g., built-in legal terms). As the terms are built-in to the NFTs and live on public blockchains and/or public decentralized file storage systems, they are transparent, accessible, and immutable.

In accordance with various embodiments, the NFT platform may provide a user with an option to create the terms for the NFT from one or more template or base NFT terms. Under the new NFT protocol, NFTs may be divided into two main categories: Ownership representation and license representation. Ownership representation means that an NFT represents the ownership of copyright and/or other intellectual property (IP) rights of all underlying asset linked to the NFT. License representation means that an NFT represents a license to the copyright and/or other intellectual property (IP) rights of all underlying asset linked to the NFT. Where an NFT also represents a membership to certain organizations, clubs, groups and so on, the above ownership or license representation will be in addition to the membership representation.

Licenses may be divided, to begin with, in four types. License text may be modular, and may be organized in multiple sections, each with a tag. Based on their intentions, an NFT creator can select the proper tags to compose the license they want to be built into the NFT that they plan to create. The four example types of licenses and their corresponding tags are the following: ECR—Exclusive Commercial Rights License; NECR—Non-Exclusive Commercial Rights License; PR—Personal Rights License; CC0—Creative Commons license (all copyrights are waived). Under each of these example license types, there will be various text modules (sections), which will also be tagged, for the creator's choice. Example template NFT terms include Beginning & Definitions, Disclaimers, Limitations of Liability, Assumption of Risk, Fundamental Elements, Template Provider Disclaimer, Indemnification, Irrevocability, Revocability, Time Limit of License, Modification and Derivative Works, No Rights to Trademarks, Transfer and Sublicensing, No Third Party Content, Third Party Content, Third Party Content License, Restrictions, Additional Features, Termination of License, Miscellaneous, and/or Governing Law & Arbitration, just to name a few.

Similar terms modules and tags may exist for each license types. The licensing term texts, structured in modules, are merely templates, which templates, including the default options, are open for creators to edit as they see fit based on advice from their legal counsel. These terms templates may be based on U.S. laws or based on laws of other jurisdictions, and may be updated from time to time to reflect the changes in the laws. Some of the term modules may be interrelated, such as Irrevocability, Revocability, Time Limit of License, Modification and Derivative Works, etc. In that case, the NFT platform protocol algorithm will sort them out before compiling the terms into a complete license document.

The terms for the NFT (e.g., the legal terms), may be represented by corresponding tags for their templates sections, become part of the metadata of an NFT project, along with the underlying digital file(s) (e.g. any images, videos, or music, etc.) which the NFT represents. On the NFT platform, a creator can select the proper tags corresponding to different NFT terms templates by clicking the corresponding check boxes, in addition to the default tags which are applicable for most projects. If the creator chooses, they can also edit the corresponding texts in each tag, including the default tags. Based on the terms selected, the algorithm in the NFT platform implementing the new NFT protocol creates a full license document, in PDF for example, which will be uploaded to a public file storage network such as IPFS, e.g., as the NFT secondary file information file of NFT Terms file. Once the metadata (e.g., digital file) is prepared by the creator, the NFT smart contract will be created by the NFT platform according to the new NFT protocol on the creator's behalf and deployed to a blockchain.

As such, the method may include the NFT platform providing template NFT terms to a creator for selection. The method may also include the NFT platform receiving selections of template NFT terms, e.g., from a creator. The method may also include the NFT platform generating the NFT secondary file information (e.g., the NFT Terms) based at least in part on the selections.

When a creator mints an NFT, or designates the platform to mint an NFT, they may need to determine whether they want to have the NFT represent the full ownership of the underlying asset, including ownership of copyright and all intellectual property rights, or have the NFT merely represent a license to the rights to the underlying asset. The former would be an ownership NFT, the later would be a licensing NFT.

Using the Ethereum blockchain and its ERC721 standard as an example, the protocol could deploy the following NFT smart contract for a PuppyNFT project:

```
import "@openzeppelin/contracts/token/ERC721/ERC721.sol";
import "@openzeppelin/contracts/utils/Counters.sol";
import "@openzeppelin/contracts/access/Ownable.sol";
```

-continued

```
import "@openzeppelin/contracts/token/ERC721/extensions/ERC721URIStorage.sol";
contract PuppyNFT is ERC721URIStorage, Ownable {
    using Counters for Counters.Counter;
    Counters.Counter private _tokenIds;
    constructor( ) ERC721("PuppyNFT", "Puppy") { }
    function mintNFT(address recipient, string memory tokenURI)
        public onlyOwner
        returns (uint256)
    {
        _tokenIds.increment( );
        uint256 newItemId = _tokenIds.current( );
        _mint(recipient, newItemId);
        _setTokenURI(newItemId, tokenURI);
        return newItemId;
    }
}
```

Here the function mintNFT(address recipient, string memory tokenURI) allows the owner (creator) to mint an NFT, where address recipient specifies the address that will receive the minted NFT, and string memory tokenURI is a string that resolves to a JSON document that describes the NFT's metadata.

The following is an example of a JSON file (NFT metadata) that includes example licensing terms a creator intended for a licensing NFT:

```
{
    "description": "My adorable Nala in 2022.",
    "image": "ipfs.io/ipfs/QmZRS5nd6XSu9MYTc8TdHTgew4UEgQYyXgvRxtaAJfhDoD",
    "name": "Nala",
    "attributes": [
        {
            "trait_type": "Breed",
            "value": "Australian Shepherd"
        },
        {
            "trait_type": "Sex",
            "value": "Female"},
        {
            "trait_type": "Eye color",
            "value": "Brown"},
        {
            "trait_type": "Fur color",
            "value": "Blue Merle"}
    ],
    "terms": [
        {"Type": "PR - Personal Rights License",
         "summary": "IRREVC, MODD=No, NTPC, TLOL=Perpetual"
        }
    ],
    "full terms": "ipfs.io/ipfs/QmYHJARLiUpMgmJKmQ5DER4WbQ7QCHfqeYctReRTnBFFcw"
}
```

The following is an example of a JSON file (NFT metadata) that includes example terms the creator intended for an ownership NFT:

```
{
    "description": "My adorable Nala in 2022.",
    "image": "ipfs.io/ipfs/QmZRS5nd6XSu9MYTc8TdHTgew4UEgQYyXgvRxtaAJfhDoD",
    "name": "Nala",
    "attributes": [
        {
            "trait_type": "Breed",
```

```
        "value": "Australian Shepherd"
    },
    {
        "trait_type": "Sex",
        "value": "Female"},
    {
        "trait_type": "Eye color",
        "value": "Brown"},
      {
        "trait type": "Fur color",
        "value": "Blue Merle"}
],
"terms": [
    {"type": "Ownership",
      "summary": "Full Ownership"
      }
],
"full terms":
    "ipfs.io/ipfs/
QmWY2MS9dt9qBkdRionkjABez781qUCiuvTxUXZC8Q6BCA"
}
```

When an ownership NFT is sold, the NFT owner would give up all ownership rights to the new owner. Delivery of the NFT to the new owner's wallet is equivalent to delivering those ownership rights.

Note that the example "full terms" file (located at the linked URL indicated in the above metadata example), in the physical asset section, may make clear that the NFT does not represent the linked physical asset. In this example, the digital asset is the picture of a dog named Nala. The linked physical asset is the dog herself. In the example above, selling the above NFT means selling the ownership rights to the picture, not the physical dog.

If, however, the NFT creator does indeed intend to have the NFT represent the physical dog herself, the physical_asset section may be changed to read "This NFT also represents the ownership of the physical asset linked to the digital asset. Purchasing this NFT means purchasing the ownership of both the linked digital asset and the linked physical asset." This is not a trivial application, as the physical asset could be a pair of high-end sneakers, or even a house.

It is easy to understand the need to have licensing NFTs for many creators who want to retain the ownership of the underlying assets while being able to sell licenses to their artwork. However, ownership NFT may also be useful for such artists. For example, an artist who creates generative digital arts routinely with computer algorithms may create tens of thousands or even millions of pieces of unique art instantly, and they may be happy to sell the individual NFTs without retaining the ownership of the underlying artwork—tracking down potential ownership rights violations in that case is very difficult anyways. In another example, a blockchain game player, who creates many pieces of player-created-in-game NFTs that can be used by other players, may be happy to sell his NFTs without retaining any ownership rights. In another example, a creator may genuinely want to simply sell the ownership of his artwork in NFTs for whatever reasons. Conversely, for the streaming applications presented below, it is important for the creator/owner to possess the ownership NFT of his artwork proving that he owns the artwork, and not for any streaming users who will also possess a copy of his artwork to own the underlying artwork.

The new NFT protocol may exist as a layer between marketplaces (such as ACKCS.io), service providers with which creators/owners/users interface, and blockchain networks and the IPFS network. The new NFT protocol enables platforms and marketplaces for NFTs minting, purchase and sale, artwork/music/movie/video streaming services, software licensing that also extends to clubs and DAOs membership services, and event ticketing, as well as enabling physical assets tokenization and trading.

Figure 3:
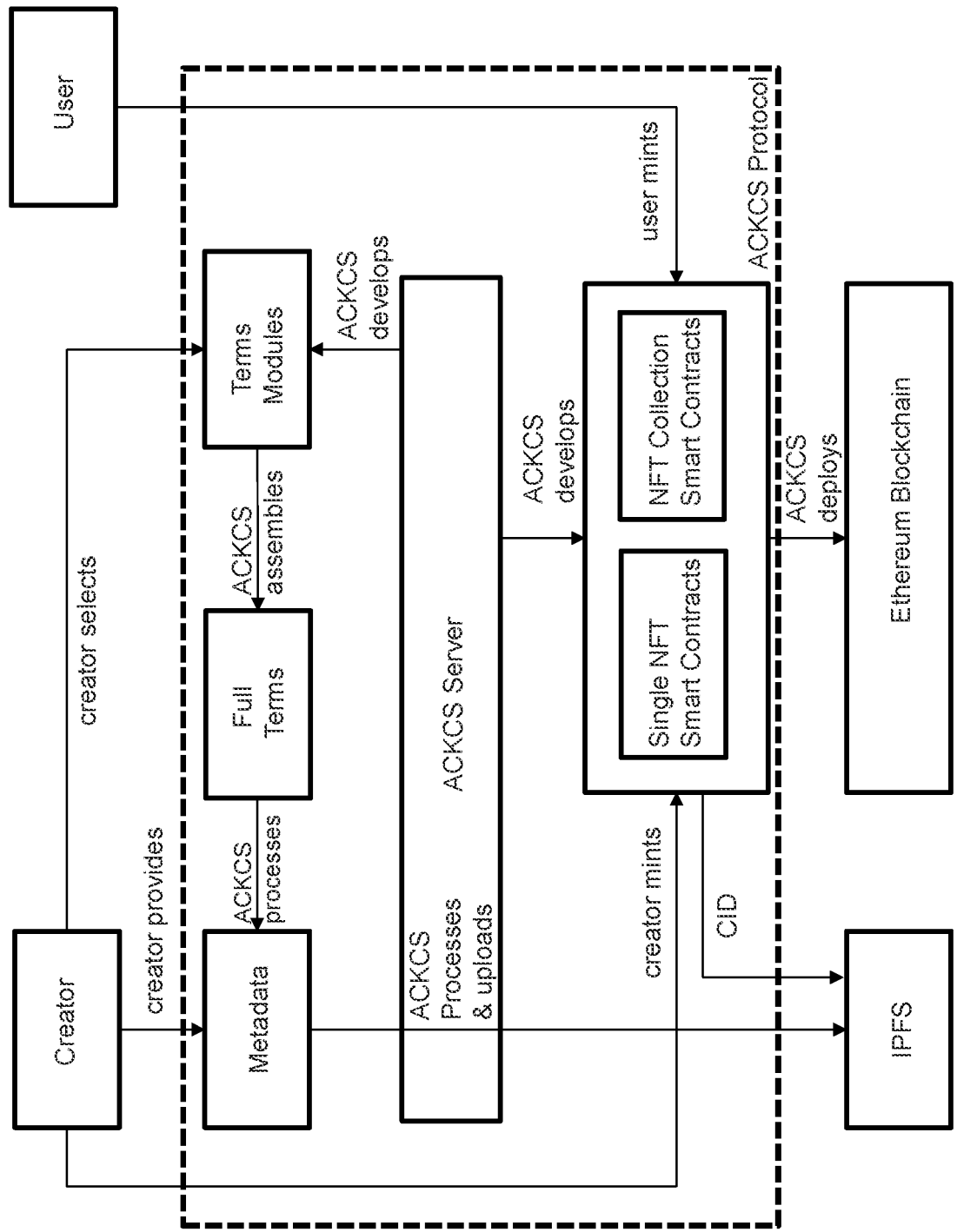
FIG. 3 shows a block diagram illustrating an example work flow of the new NFT protocol in accordance with various embodiments.

As a recap, FIG. 3 shows a block diagram illustrating an example work flow of the new NFT protocol in accordance with various embodiments. As discussed above, the creator may provide the metadata (e.g., digital file) to the NFT platform (e.g., ACKCS server). The creator also selects NFT term modules. The NFT platform then assembles the full terms for the NFT (e.g., the NFT secondary file information) and adds it to the metadata of the NFT (e.g., in the Metadata JSON file and/or in the NFT secondary file information file), which are stored on a public decentralized storage system such as IPFS, along with the digital file. The NFT platform generates the smart contract (single or collection), which is deployed to the blockchain. The creator and/or a user (e.g., purchaser) can then mint the token from the smart contract, which is also recorded on the blockchain, and can access the Metadata (digital file or other documents) using the CID of the desired filed.

The new NFT protocol may enable fees to be exchanged as well. In the above general embodiments, the user may pay a fee set by the creator plus a transaction fee (e.g., blockchain transaction fee or "gas" fee) to the NFT platform. The NFT platform may retain a protocol fee, and provide the transaction fee to the blockchain validators. The NFT creator may then receive an NET profit amount minus the transaction fee.

Streaming NFTs

Many great physical artworks are stored in private collections or in museums, which are difficult, if not impossible, for ordinary people to access and enjoy. Some of these arts have digital versions that people can find online, but usually they are of poor quality. In accordance with various embodiments, the new NFT protocol provides a way for people around the world to have access and enjoy, legitimately, these great works created by humankind's artistic masters.

Digitizing physical art and allowing users, who otherwise have no access, to stream it for a fee, benefits both the artists/owners and the users: Artists/owners generate revenue with their otherwise illiquid assets; users enjoy great art with small fees.

With respect to natively digital art, people can and do go online, find them, and the save them for their own enjoyment without paying anything. Users can be categorized into two groups: individuals and institutions. Institutions would consist of various organizations, such as corporations, non-profit organizations, museums, art galleries, schools, government agencies, etc. An easy argument can be made that institutions, when possible, would prefer to access the arts, digital or otherwise, in a legitimate way, simply to avoid any legal issues if for no other reasons. For individual users, there will be no doubt that some will always avoid paying fees for whatever art they can find online for free. However, the NFT platform of the present disclosure can be made very user friendly, can provide artwork in high quality format (e.g., high-resolution pictures for paintings as opposed to poor quality versions found online), and can be made to provide other associated benefits (e.g., art related social networking as enabled by NFTs as membership proof), and run the business based on large volume and low fee, which can be a net-positive for individual users as well as institutional users.

Generally, people are familiar with music and movies streaming. A piece of digital artwork such as a painting usually being a single picture, the word streaming is used here as an edge case, and the concept is borrowed because people are already familiar with it.

In an embodiment, a creator may navigate to a streaming zone of the NFT platform. They may provide the artwork that he has full ownership with the intention of letting users stream it. They may then assemble the streaming terms from the available licensing terms modules by selecting the appropriate tags, for which the platform will generate a Streaming Terms file, e.g., in PDF format, with its code algorithms. The creator may also specify the streaming price. The platform may deploy two sets of smart contracts, one creating an ownership NFT for the creator, and the other creating streaming NFTs (sNFTs) for streaming users to mint. When a user goes to the streaming zone on the platform, he finds the ownership NFT and selects it to stream. The NFT platform will use the underlying artwork and the streaming terms as the metadata, create an sNFT, and send it to the user's wallet upon confirmed payment.

Because IPFS is an open public network, anyone with a content identifier (CID) can access the content. When an owner intends to create an NFT for people to stream the artwork, he (or the NFT platform) may prepare two digital versions of the artwork: a high-resolution version (the original) and a low-resolution version. Both versions may be uploaded to IPFS by the ACKCS platform and two CID's will be generated: hCID (corresponding to the high resolution version) and lCID (corresponding to the low or partial resolution version). However, the platform will encrypt the hCID with the owner's public key (or private key) as well as an ACKCS private key, to form an encrypted CID (eCID). In certain embodiments, the widely used Advanced Encryption Standard (AES) can be used as the algorithm to encrypt the hCID. When the owner connects his wallet with the platform, the platform algorithm will decrypt the eCID, so that the owner can view both versions of his art before he lists it for users to stream. Anyone else with a wallet other than the owner's public key connected to the platform will not be able to see the high-resolution version of the art because they do not have the hCID (decrypted from the eCID). The process may be as follows:

Owner creating NFT:
eCID=encrypt {owner's Public_Key, ACKCS Private_Key, hCID}→NFT metadata.

Owner viewing NFT:
hCID=decrypt {owner's Public_Key, ACKCS Private_Key, eCID}→Platform displays original artwork.

Note that in the encrypt and decrypt functions above, the owner's Public_Key can be replaced with owner's Private_Key, either of which is specific to the owner.

Using the previous puppy NFT example, the following is an example of NFT metadata for the owner NFT:

```
{
  "description": "My adorable Nala in 2022.",
  "image-low res":
  "ipfs.io/ipfs/QmZRS5nd6XSu9MYTc8TdHTgew4UEgQYyXgvRxtaAJfhDoD",
  "image - original": (eCID)
  "name": "Nala",
  "attributes": [
      {
        "trait_type": "Breed",
          "value": "Australian Shepherd"
      },
      ]
       .........
    "terms": [
      {"type": "Ownership",
        "summary": "Full Ownership"
      }
  ],
  "full terms":
  "ipfs.io/ipfs/
  QmWY2MS9dt9qBkdRionkjABeZ781qUCiuvTxUXZC8Q6BCA"
}
```

Note that whoever investigates the owner's wallet will not be able to view the high-resolution version of the artwork because the encrypted hCID (eCID) in the metadata for the NFT.

When a user streams an NFT after viewing the low-resolution version of the art (e.g., using the lCID), the NFT platform may encrypt the hCID with the streaming user's public key (or private key) and an ACKCS private key, and generate a streaming encrypted CID (seCID), again using the AES encryption algorithm. When minting the sNFT, the NFT platform may include the lCID and seCID in the sNFT's metadata. When the streaming user connects his wallet to the ACKCS platform, the platform will use the user's public key and the ACKCS private key to decrypt seCID to the hCID, so that the streaming user will be able to view (and download) the high-resolution art. Anybody else will not be able to view the high-resolution art even though they may check out the sNFT in the streaming user's wallet and see its metadata, because the hCID is encrypted (as seCID). People may be able to see the low-resolution version of the artwork, however, using the unencrypted lCID. The process may be as follows:

User Streaming owner's NFT:
    seCID=encrypt {user's Public_Key, ACKCS Private_Key, hCID}→sNFT metadata.
User viewing sNFT:
    hCID=decrypt {user's Public_Key, ACKCS Private_Key, seCID}→Platform displays original artwork.

Again, in the encrypt and decrypt functions above, user's Public_Key can be replaced with user's Private_Key, either of which is specific to the streaming user.

Using the previous puppy NFT example again, the following is an example of NFT metadata for the streamer NFT (sNFT):

```
{
    "description": "My adorable Nala in 2022.",
    "image-low res":
    "ipfs.io/ipfs/QmZRS5nd6XSu9MYTc8TdHTgew4UEgQYyXgvRxtaAJfhDoD",
    "image - original": (seCID)
    "name": "Nala",
    "attributes": [
        {
            "trait_type": "Breed",
            "value": "Australian Shepherd"
        },
    ]
        .........
    "terms": [
        {"Type": "SLPU - Streaming License for Personal Use",
        "Summary": "IRREVC, MODD=No, NTPC, TLOL=Perpetual"
        }
    ],
    "full terms":
    ipfs.io/ipfs/QmYHJARLiUpMgmJKmQ5DER4WbQ7QCHfqeYctReRTnBFFcw"
}
```

Technically, to stream NFTs is to create multiple—potentially millions, depending on user demand—sNFTs using the same digital artwork. Because the tokens are based on the same underling digital asset, the term non-fungible-token (NFT) does not strictly suggest uniqueness here. The sNFTs do represent the rights based on the built-in streaming license terms, however. The streaming terms will essentially be a non-exclusive personal rights license, for the fact that the underlying assets are the same for multiple users, and the purpose is, e.g., for art appreciation and enjoyment. However, based on the technical implementation illustrated above, an sNFT owner will be unable to resell the sNFT because the hCID is encrypted with his, not the potential buyer's, public key, (and an ACKCS private key,) similar to a traveler not being permitted to sell his air ticket to another person. This is also the reason why the term "streaming" is used here to describe the user's activities of obtaining the artwork for appreciation and enjoyment, instead of purchasing. The term "purchasing" may imply that the user, e.g., by the First Sale Doctrine, would be able to resell the sNFT he bought. Instead, here, what the user has paid for is a service the NFT owner provides that cannot be resold. This same reasoning applies to music, movies and videos streaming described below.

As explained above, in various embodiments, the widely used Advanced Encryption Standard (AES) may be used as the algorithm to encrypt the CID. Specifically, the encryption process may include the following steps:

Obtain the CID once the digital asset file is uploaded to IPFS. The CID may be 256 bits as the content on IPFS is hashed with sha2-256 hashing algorithm by default.
    Using sha2-256, hash {user Publick_Key, ACKCS Private_Key} and generate a 256 bit Secret Key.
    Divide the CID into blocks of 128 bits each. In case the CID is not an exact multiple of the 128 bit block size, it will be padded to fit.
    Apply the AES encryption algorithm to the CID with the Secret Key to generate a ciphertext (the eCID, or encrypted CID).
    Write the eCID in the metadata file.

To decrypt the eCID, the ACKCS platform applies the same AES algorithm with the Secret Key, to transform the eCID back into the original CID. Note that the NFT Platform does not necessarily save the Secret Key, it simply regenerates the Secret Key with the user's public key (along with the ACKCS private key) when the user connects his wallet to the platform.

Music Streaming NFTs

Music refers to sound recordings based on underlying musical compositions. A Musical Composition consists of music, including any accompanying words, and is normally registered as a work of performing arts. The author of a musical composition is generally the composer and the lyricist, if any. A musical composition may be in the form of a notated copy (e.g., sheet music) or in the form of a phonorecord (e.g., cassette tape, or CD). For copyright purposes, music compositions and sound recordings are different works for which copyrights are registered separately unless the ownership of both happen to be the same.

For users of the new NFT platform to create NFTs for their sound recordings, it is important for the users to be able to indicate the ownership situation of the underlying musical compositions work: 1) the NFT creator has the copyright ownership; 2) the NFT creator does not have the ownership, but has a direct license from the owner; or 3) the NFT creator does not have the ownership, but intends to use a compulsory license, and to satisfy all legal obligations such as paying royalties in order to use the compulsory license. The ACKCS terms modules may include appropriate options for the NFT creator to choose from for more complications in areas such as the means of transmission—public performance of music, especially when broadcasting is concerned.

Note that the owner of a musical composition work could also create an NFT that represents his copyright ownership, and he could sell or license that NFT on the NFT platform, but that is different than music streaming being presented here.

It is anticipated that the most often streamed music will be songs. The size of a typical song is like the size of a digital painting. The technical implementation of music streaming NFTs will be like artwork streaming NFTs. When a music NFT owner wants to create his NFT for people to stream, instead of uploading high-resolution and low-resolution versions of the artwork, he may upload the full song and a short version (say 45 seconds) of the song. The creation of the owner NFT, encryption and decryption of CID's, minting of the sNFT, may all be like that of artwork streaming NFTs discussed above.

Movie and Video Streaming NFTs

Movies and videos streaming is like music. However, movie and video files are much larger than music files, with significantly higher monetary value. Also, online shoppers are used to either buying or renting a movie, such as is the case with Amazon Prime Video.

The technical implementation for movies and videos streaming is like music. However, a streaming user will have two options: buy (i.e., license) or rent. In some examples, buying a movie or video means that the user can download it to his own device. However, by renting the movie or video, the user cannot download it. To implement this, when a user buys the movie or video, the sNFT will be sent to their wallet, which they can connect with the NFT platform anytime to download the movie or video. When the user rents a movie or video, upon receiving payment from their wallet, the platform will display the movie or video within a three-day period for them to watch with their wallet connected.

Note that the owner who creates the movie or video NFT may upload the full movie/video along with a short movie trailer (or a representative picture such as a typical movie commercial poster) to the platform, like high-resolution and low-resolution artwork. Users who have purchased a movie or video will have the trailer or poster picture in their wallets and others will be able to watch the trailer/poster from their wallet. However, others will not be able to watch the full movie as its CID is encrypted as an seCID.

Because the movie/video file sizes can be very large, the NFT platform may use a pinning service such as Pinata. cloud, so that distribution of the files around the world does not entail a high latency.

Accordingly, in various embodiments, an ownership NFT may be created that represents the ownership of the underlying digital asset, as is evidenced by the built-in terms. The ownership NFT's metadata may contain two versions of the underlying digital asset, the original version (e.g., high resolution artwork, full-length song, full-length movie/video), and the "reduced" version (e.g., low resolution artwork, truncated song, movie/video trailer, representative image, etc.). Both versions of the digital asset may be stored in either a public decentralized data storage network, a private data storage network, or private data server. But the link, file path, or Content ID (CID) to the original digital asset in the NFT's metadata is encrypted with the owner's crypto public key (open to public view) or private key (secret), along with an ACKCS private key (secret), therefore only allowing the owner to view the original digital asset. Non-owners can view the "reduced" digital asset but not the original because of the encryption.

A streaming NFT (sNFT) is created based on the ownership NFT's metadata, but with built-in terms which indicate that the sNFT represents a license instead of ownership to the underlying asset. Further, the link, file path, or CID to the original digital asset is encrypted with the streamer's crypto public key or private key (and an ACKCS private key), so only the streamer who paid for the sNFT can view the original digital asset. People other than the sNFT owner can however view the "reduced" version of the digital asset.

In accordance with the proceeding, the method performed by the NFT platform may include encrypting a content ID (e.g., eCID or seCID) of a second digital file stored in the data storage to form an encrypted content ID, wherein the second digital file is related to the first digital file. In this example method, the first digital file may represent the "reduced" version of the digital asset (which may be addressed using the lCID), and the second digital file may be the full underlying digital asset (e.g., the full original image, the full song, or the full movie). The method may also include generating the NFT metadata file (e.g., JSON file) comprising the encrypted content ID of the second digital file. The JSON file may also include the CID of the first digital file as well (e.g., the lCID).

In certain embodiments, the first digital file is at least one of a lower resolution version of the second digital file; an incomplete portion of the second digital file; and/or an image corresponding to the second digital file when the second digital file is a video file or an audio file.

When creating the owner NFT, in various embodiments, the method may include the NFT platform encrypting the content ID of the second digital file to form the encrypted content ID (eCID) using a cryptographic key of an issuer of the NFT and a cryptographic key of the NFT platform. Further, the method may include the NFT platform generating the NFT secondary file information (e.g., the NFT Terms) including the encrypted content ID of the second digital file. Similarly, when creating the streaming NFT, in various embodiments, the method may include the NFT platform encrypting the content ID of the second digital file to form the encrypted content ID (seCID) using a cryptographic key of a streaming user of the second digital file and a cryptographic key of the NFT platform.

In order to allow a streaming user to access and view the underlying digital asset of the NFT, the method may include the NFT platform decrypting the encrypted content ID (seCID) of the second digital file stored in the data storage using the cryptographic key of the streaming user and the cryptographic key of the NFT platform. In certain examples, the method also includes the NFT platform retrieving the second digital file from the data storage, and streaming (or causing to be streamed) the second digital file to the streaming user.

Figure 4:
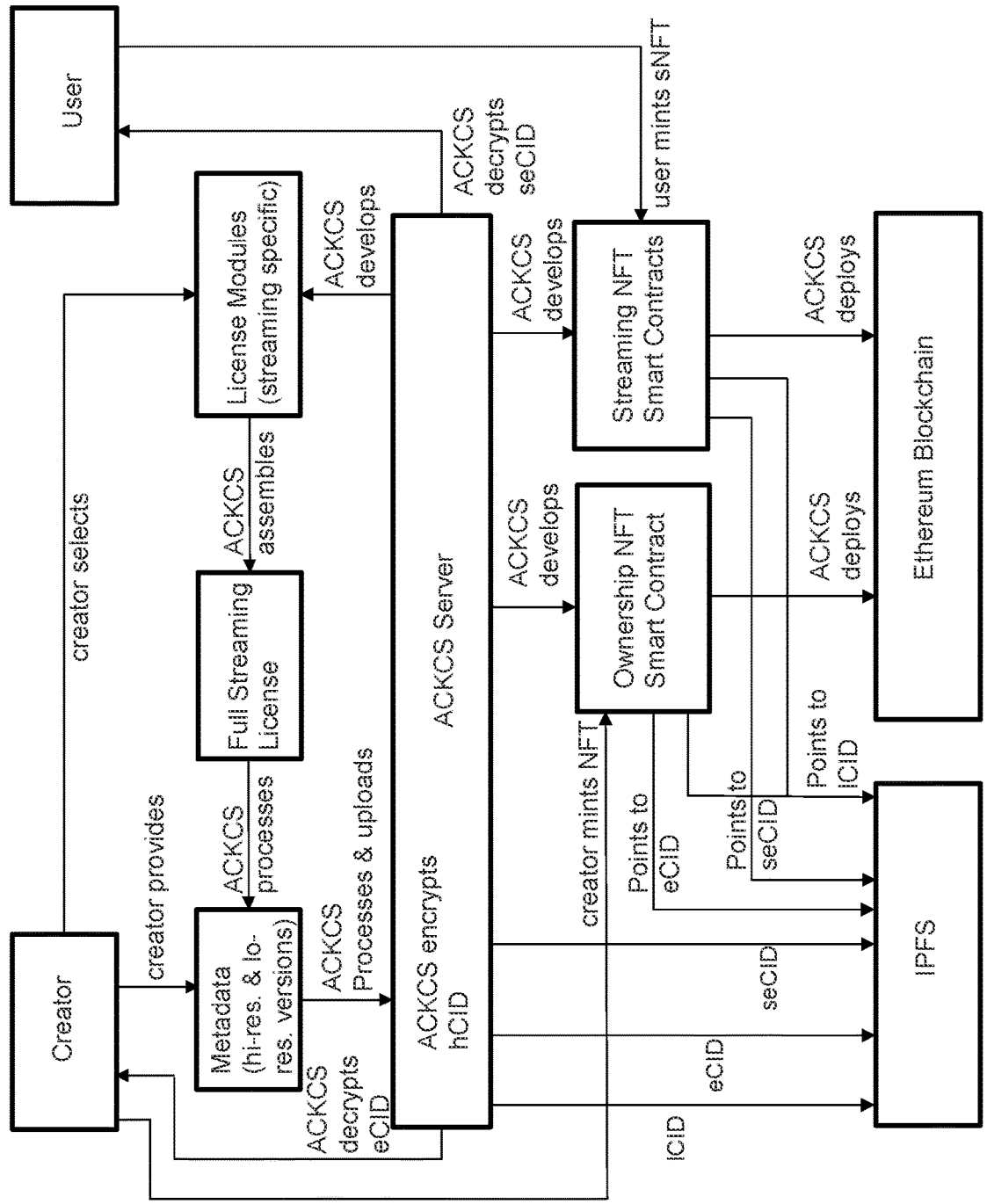
FIG. 4 shows a block diagram illustrating an example streaming work flow of the new NFT protocol in accordance with various embodiments.

As a recap, FIG. 4 shows a block diagram illustrating an example streaming work flow of the new NFT protocol in accordance with various embodiments. As discussed above, the creator may provide the metadata (e.g., digital file) to the NFT platform (e.g., ACKCS server), which may include a high resolution and a low resolution version. The creator also selects NFT term modules (e.g., license modules) specific to streaming. The NFT platform then assembles the full terms for the owner NFT and/or the streaming sNFT (e.g., the NFT secondary file information) and adds it to the metadata of the NFT (e.g., in the Metadata JSON file and/or in the NFT secondary file information file), which are stored on a public decentralized storage system such as IPFS, along with the digital file. The NFT platform generates the ownership NFT smart contract, which is deployed to the blockchain, which may include the lCID of the low resolution version of the content, and an encrypted version (eCID) of the hCID of the content stored on the IPFS and encrypted using the creator's private or public key and the ACKCS private key. The NFT platform also may generate the streaming sNFT smart contracts, which are deployed to the blockchain, and which may include the lCID of the low resolution version of the content, and a streaming encrypted version (seCID) of the hCID of the content stored on the IPFS and encrypted using the streaming user's private or public key and the ACKCS private key. The creator can mint an owner NFT from the ownership NFT smart contract, which includes an encrypted eCID and the lCID. The owner can then access the content using the eCID. Similarly, the streaming user can mint a streaming sNFT from the streaming sNFT smart contracts, which includes the encrypted seCID and the lCID. The streaming user can then stream the content using the seCID.

The example NFT Streaming Work Flow illustrated in FIG. 4 and discussed above applies to artwork, music, movie, and video streaming, as explained in the previous sections. Artwork is used as an example in FIG. 4. When applied to movie streaming, high-resolution and low-resolution versions of artwork will be replaced with full-length movie and movie trailer (or a movie poster). For movie/video rental (no download), no sNFT will be minted and sent to the user's wallet. Instead, the user will be able to watch the movie/video when his wallet is collected to the platform and is within a time frame (e.g., three days) of payment. Also, the NFT platform provides streaming specific license term modules for creators to select from when they create ownership NFTs, preparing for listing in the streaming zone for users to stream.

The new NFT protocol may enable fees to be exchanged as part of the streaming offerings. In the above general embodiments, the user may pay a streaming fee set by the creator plus a transaction fee (e.g., blockchain transaction fee or "gas" fee) to the NFT platform. The NFT platform may retain a protocol fee, and provide the transaction fee to the blockchain validators. The NFT creator may then receive an NFT streaming profit amount minus the transaction fee.

Software NFTs

Since software licensing became the standard practice decades ago, the ways users purchase (i.e., license) software may include purchasing an item of hardware with the software pre-installed, purchasing a software CD from a retail store, or downloading a software online, then obtaining the key to unlock the software after payment online. With the blockchain and modern NFT technology, there are more interesting ways for software licensing using NFTs that are very advantageous to both software developers and end users. This is particularly true with the emergence of decentralized applications (dApps).

Blockchain technology is only about a dozen years old, but there are already over 1000 live blockchains. The number of dApps built on blockchains in 2022 was over 4,000, and is growing daily. Many dApps are open sourced and freely available to the public. The dApps may be developed by someone as a hobby and a pro bono service for the public, or by a dedicated team. To develop a major dApp requires serious resources and funding. Many projects secure funding from venture capital companies in exchange of fungible tokens issued by the project. NFTs can provide a new way for project funding during software development, and to distribute the software or admit users with various preferred licensing terms.

In an example setting, the software or dApp team deploys, or designates the platform to deploy, an NFT contract for the specific software on the NFT platform by selecting the proper licensing terms, licensing duration options (1-year, 2-year, 5-year, etc.) and corresponding licensing fees. They can also create different tiers of licenses depending the complexity of their software. The team also may create a landing page to their software or dApp interface, where the users will connect their wallets. In order for a user to use the software/dApp, or to use certain features (the team may decide that certain features can be used for free by anybody), the user may need to have a software-specific NFT in his wallet. The software landing page will check the user's wallet to see if the user has such an NFT. If not, it will direct the user to the ACKCS platform to purchase an NFT in order to use the software, or to use certain features. In this example, the NFT represents a license to use the software as well as the "key" to unlock it. The metadata of the NFT could include a feature picture of the software (e.g., as the underlying digital file), some descriptions, in addition to the licensing terms.

On the NFT platform end, a user who buys the software NFT may select the license duration (e.g., 1-year) and makes the payment which goes into the software team's wallet. The platform may then mint an NFT and send it to the user's wallet. In certain examples, an important feature of this NFT is that it will self-destruct upon expiration (e.g., the platform-deployed smart contract will send it to the burn address). The user may come back one year later to re-purchase an NFT to continue using the software.

The software NFT may also work for groups, clubs, and various organizations including Decentralized Autonomous Organizations (DAOs) representing memberships. The technical implementation will be the same. The NFTs bring the members together and could create a better community, because various benefits can be created and attached to the NFTs. It could also be an efficient way to promote certain software or dApp by simply airdropping limited time duration NFTs into wallets of targeted groups for them to try the software.

Accordingly, NFTs are used to represent software licenses or software subscription services. The software NFTs have built-in terms, which may include license duration or subscription duration (e.g., 3-month, 1-year, 2-year, etc.). The software itself, or the software's landing page, or the software owner, may only allow a user who has the specific software NFT in their crypto wallet to use the software, or certain functions or features of the software, for the duration specified in the terms built into the NFT. Upon expiration of the specified duration, the NFT owner loses access to the software functions or features, in part or in full, depending on what is specified in the NFT terms and what is built in the NFT smart contract. This loss of access to the software functions can either be achieved by the NFT smart contract sending the NFT to a blockchain burn address, or by time and/or function limitations built into the NFT smart contract, or by limitations built into a non-smart contract computer algorithm.

In accordance with various embodiments, the method may include the NFT platform generating the smart contract including an NFT expiration time and instructions for the NFT to self-destruct upon reaching the expiration time, wherein the NFT represents a license to use a software application.

Figure 5:
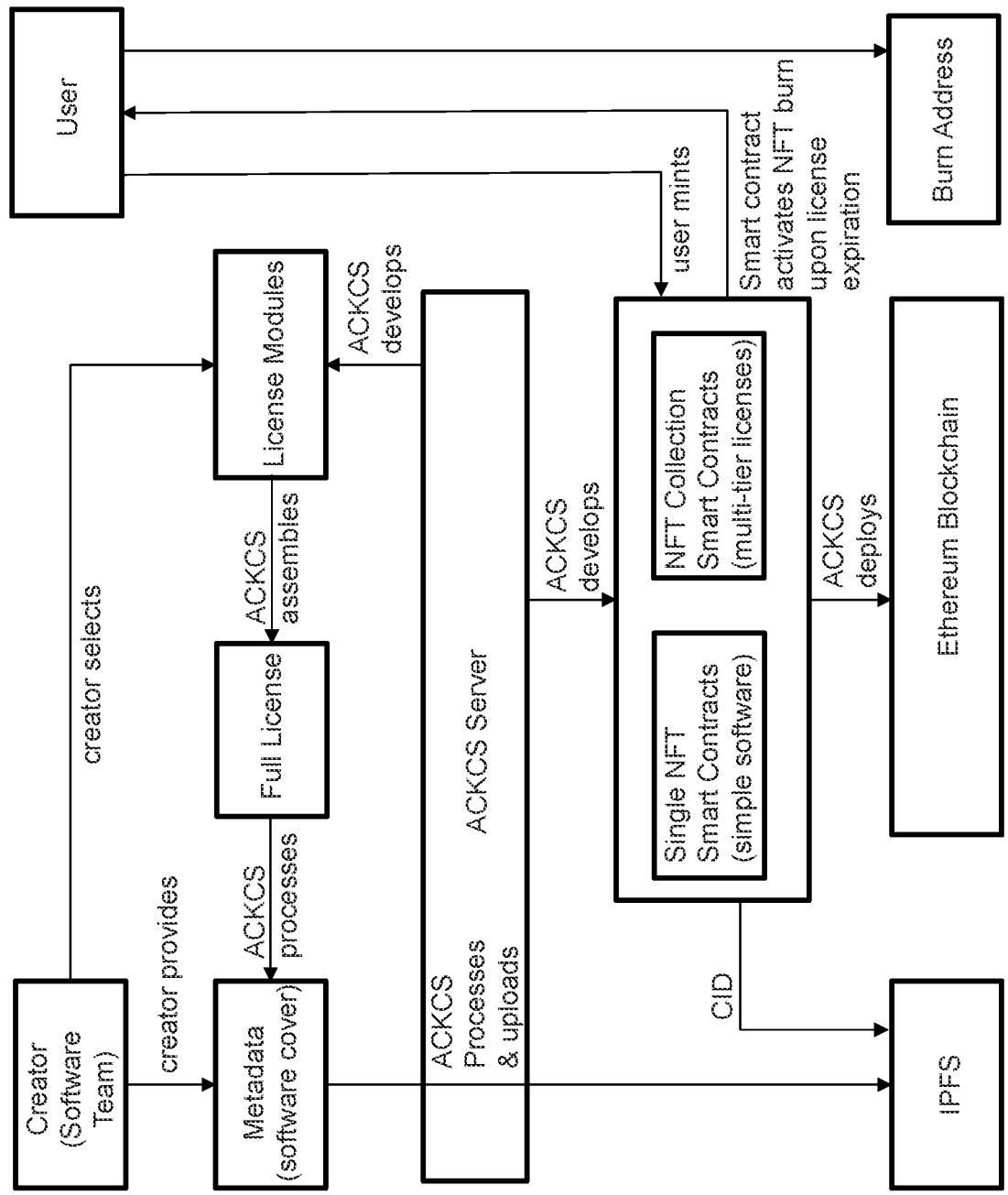
FIG. 5 shows a block diagram illustrating an example software NFT work flow of the new NFT protocol in accordance with various embodiments.

As a recap, FIG. 5 shows a block diagram illustrating an example software NFT work flow of the new NFT protocol in accordance with various embodiments. As discussed above, the creator (e.g., software team) may provide metadata (e.g., digital file, such as an image of the software cover) to the NFT platform (e.g., ACKCS server). The creator also selects NFT term modules (e.g., license modules). The NFT platform then assembles the full terms for the NFT (e.g., the NFT secondary file information) and adds it to the metadata of the NFT (e.g., in the Metadata JSON file and/or in the NFT secondary file information file), which are stored on a public decentralized storage system such as IPFS, along with the digital file. The NFT platform generates the smart contract (simple or multi-tier licenses), which is deployed to the blockchain. The user (e.g., purchaser) can then mint the software NFT from the smart contract, which is also deployed on the blockchain, and can access the Metadata (digital file or other documents) using the CID of the desired file. Importantly, the user can then access the software (or certain features of the software) by simply having the NFT in their wallet. After expiration of the license duration, the NFT smart contract may send the NFT to the burn address, thereby ending the user's access to the software In the above description and Software NFT Work Flow of FIG. 5, note that the software itself is not included in the metadata. Instead, a software cover featuring the software may be included, though other options are possible. This is because, in essence, the software NFT represents a license key for the user to have access to the software or software features. The purpose is not for the user to download the software. If a software team indeed wants to use NFTs to represent copies of the actual software for users to purchase and to download, they may use the movie streaming (download option) method described above. The work flow will be the same.

The new NFT protocol may enable fees to be exchanged as part of the software NFT offerings. In the above general embodiments, the user may pay a software license fee set by the creator plus a transaction fee (e.g., blockchain transaction fee or "gas" fee) to the NFT platform. The NFT platform may retain a protocol fee, and provide the transaction fee to the blockchain validators, as well as an NFT burn transaction fee if required. The NFT creator may then receive an NET profit amount minus the transaction fee.

Ticket NFTs

The general idea of using NFTs to represent tickets to events (physical or virtual) is for the entity who owns the rights to an event to deploy to a blockchain an NFT collection specific to the event using the NFT platform. The number of editions of the collection may be the maximum number of audience members permitted by the event. Each NFT smart contract will be event-specific. There are a few factors to consider when technically implementing ticket NFTs, which are discussed below.

For events with assigned seats and different pricing for seat sections, this can be implemented by different NFT "pre-sale" periods. For instance, VIP section seats may be allocated in a first pre-sale period with VIP seat pricing, with or without whitelist at the event owner's option. Premier Section A seats will be allocated in the second pre-sale period with Premier Section A pricing, and so on. General seating will be allocated in the "public mint" period without whitelist. For events without assigned seats and no differentiated pricing, it may be simply a public mint period where anyone can mint at any time until all the NFTs are minted (e.g., all the tickets are sold out).

A ticket NFT's metadata may include the following information: Basic event information: event name, date, time, and location/venue; An event poster, if any; At event owner's option: customized underlying digital assets for audience of different tiers with different pricing; and/or seat information.

For customized underlying digital assets that are meant for audiences of different tiers and different pricing, the NFT Protocol may provide a process where the baseURI in the NFT smart contract can be updated based on the event owner's needs, so that it points to different metadata files at different stages during the NFT minting process. There may be two options to implement this. A first option may be during different NFT pre-sale periods, wherein the baseURI points to different metadata files which links the ticket NFTs to different underlying digital assets. A second option may be after a certain TokenID, wherein the baseURI points to a different metadata file. For example, for TokenIDs from 1 to 100, (i.e., the first 100 ticket NFT buyers), the NFTs may be linked to metadata file A, which links to underlying digital asset A. However, for TokenIDs from 101 to 500 (i.e., the second 400 ticket NFT buyers), the NFTs may be linked to metadata file B, which links to underlying digital asset B, and so on. Note, as discussed above, because of the built-in terms, and the measures the NFT Protocol takes to prevent bad actors from changing the baseURI for illegitimate reasons, the changed baseURI will not affect the metadata/digital assets for the NFTs minted prior to the baseURI updates (e.g., the first 100 ticket NFTs).

For seating selection, the NFT platform may provide algorithms for ticket buyers to select seats based on a venue-specific seating map. Once selected, the seat information may be written in the ticket NFT metadata. The NFT platform may include a large database of venue seating maps for case of processing seat selections.

The NFT platform may produce a PDF ticket for every user who mints a ticket NFT. In addition to the information listed above, the ticket may have a QR code or bar code that includes or represents, for example, the NFT smart contract address, minting transaction hash, and NFT TokenID. This QR code or bar code can be scanned by a corresponding ticketing NFT mobile phone application.

An event owner may use the ticketing NFT mobile phone application, implemented on a plurality of phones or smart devices, to scan the ticket QR code at the entrance of the event venue. For example, a ticket holder may have a smart phone, which may be linked to the wallet of the user, and may be configured to display the QR code (or otherwise output such a code, e.g., visually via display or wirelessly, e.g., via near-field communications such as Bluetooth). The ticketing NFT phone application will scan the event smart contract address and ticket NFT TokenIDs, as well as the ticket holder's wallet address. This may be compared with the NFT collections' on-chain data. If the scanned information matches the on-chain data, the ticket holder will be admitted. If the scanned information does not match on-chain data, the ticket holder will not be admitted. Note that if a ticket holder sends his ticket NFT from the original wallet by which he minted the NFT to another wallet (e.g., a wallet on his phone), only the NFT-receiving wallet holder will be admitted, because the ticketing NFT phone App can detect the NFT transfer from on-chain data.

For ticket NFTs, the NFT Platform may require a user to create an account with their email address and a phone number, for the purposes of providing notifications related to the events, such as a change of event date or location.

When the event owner deploys a ticket NFT collection on the NFT platform, they will assemble the terms, for example, from the NFT platform's terms templates, and those terms will be incorporated as part of the NFT's metadata and permanently recorded on the public data storage. Depending on the specific event, the event owner may specify in the terms additional benefits and privileges for NFT holders, on top of their right to attend the event, thus creating a more sticky relationship between artists and sports celebrities with their fans.

Normally the value of a ticket NFT derives from the right to attend a specific event and possible future benefits and privileges, instead of an underlying piece of digital asset. Therefore, the terms for a ticket NFT will be relatively simple. However, if the event owner chooses to also incorporate a piece of digital asset (e.g., a music clip or a sports video clip) that involves copyright or IP rights into the metadata of the ticket NFTs, they will then need to more carefully assemble the terms for the NFTs. This feature provides a powerful tool for artists/celebrities to create great fan communities.

The event owner will need to know in advance which parties are beneficiaries to the ticket NFT sales revenue, and how exactly the revenue will be split among the parties. Likewise, the event owner will also need to know in advance how ticket NFT resale revenue will be split among the beneficiaries. The revenue split agreement may also be written into the ticket NFT terms file. The deployed ticket NFT smart contract will send the sales revenue and resale revenue to the wallet addresses provided by the event owner according to the agreed upon split terms.

Ticket NFTs could potentially be re-sold before the event takes place. They may also be re-sold after the event, because they may carry future benefits and privileges, or the event owner may have incorporated a piece of underlying digital asset in the NFTs. In contrast, it is highly unlikely that anybody would buy a traditional ticket after the event has taken place. The fact that a piece of digital asset may be bundled with a NFT ticket, for either the initial sale, or resale on the secondary market, presents a significant business opportunity for event organizers/artists/promoters, due to the enormous number of tickets being sold every year.

As an example, assume a song by the event artist is to be bundled in the ticket NFT as the underlying digital asset, similar to artwork streaming NFTs and music streaming NFTs discussed above. Both the full song and a short version of it may be uploaded to IPFS, with the content ID being hCID and lCID, respectively. The hCID may be encrypted using the method presented previously. However, to enable resale of ticket NFTs, there will be a difference in how the hCID is encrypted. That is, here the hCID may be encrypted with the ACKCS Private Key alone, as opposed to using both the user's Public Key and the ACKCS Private Key. Specifically:

To encrypt the hCID of the full song:
  eCID=encrypt {ACKCS Private_Key, hCID}-→NFT metadata.
To decrypt eCID and access the hCID and hence the song:
  hCID=decrypt {ACKCS Private_Key, eCID} →Platform displays full song.

In various examples, the specific steps for using AES to encrypt and decrypt the CID leading to the full song (or other digital asset) is as follows:

Obtain the CID once the full song file is uploaded to IPFS. The CID may be 256 bits as the content on IPFS is hashed with sha2-256 hashing algorithm by default.
  Divide the CID into blocks of 128 bits each. In case the CID is not an exact multiple of the 128 bit block size, it will be padded to fit.
  Apply the AES encryption algorithm to the CID with the ACKCS Private Key to generate a ciphertext (the eCID, or encrypted CID).
  Write the eCID in the metadata file.
  To decrypt the eCID, the ACKCS platform applies the same AES algorithm with the ACKCS Private Key, to transform the eCID back into the original CID.

If a piece of digital artwork or a video/movie is to be bundled with the ticket NFT instead of a song, the process will be the same as above. Since no specific user information is used in the encryption/decryption of the CID, a ticket NFT holder will be able to resell his NFT, either before the event or after, with the underlying digital asset being protected from illegitimate access.

In accordance with the preceding, wherein the NFT represents a ticket to an event, the method may include the NFT platform generating a code corresponding to the NFT at a time of minting the NFT, the code representing an address of the smart contract and a token ID of the NFT. The method may also include presenting, by a first mobile device, the code and information corresponding to a wallet address of a present holder of the NFT. The method may include scanning, by a second mobile device, the code presented by the first mobile device and the information corresponding to the wallet address of the present holder of the NFT. The method may also include determining that the address of the smart contract, the token ID of the NFT, and the information corresponding to the wallet address of the present holder of the NFT match data on the distributed ledger system. The method may also include encrypting the content ID of the digital file to form an encrypted content ID (cCID) using a cryptographic key of the NFT platform.

Tickets represented by NFTs may also bring many other benefits and possibilities that traditional tickets do not have because they are unique and permanently recorded on the blockchain. An artist such as a musician who holds events may be able to follow up and further engage with their fans that hold the event NFTs. For instance, the musician could air drop chosen songs (e.g., music NFTs) to his fans before they are available to the general public. The relationship between a ticket NFT creator and the NFTs holders and the community formed do not rely on the NFT platform, any other organizations, or central authorities. The NFT protocol simply facilitates the creation of such relationships and communities. Once this is accomplished, it will be purely between the artist and his fans with all the terms permanently built into the NFTs, and ACKCS will be out of the picture.

Ticket NFTs may also mitigate the scalping problem with traditional tickets, by simply limiting the number of NFTs each wallet address could mint, and if necessary, limiting the re-sell price in the smart contract before the event taking place.

Additionally, ticket NFTs to events will be able to significantly promote the adoption and growth of music NFTs (and other NFTs), due to the influence of the artist or sports celebrities on their fan base and then likely spreading to the general public. Taking as an example a live event, fans (in the thousands) bought tickets months before the event date (tickets were sold out online instantly, so many, if not most, ended up buying from the secondary market, i.e., ticket scalpers. For those fans, if the tickets were sold as NFTs, there would have been no problem for them to learn how to download, install and use an, e.g., MetaMask wallet based on their determination to attend the event. Once people have used the MetaMask wallet once, there will be much less hesitance to use the same on the ACKCS platform and buy other digital assets, starting with songs from musicians whose event they attended.

Accordingly, in various embodiments, ticket NFTs are created with built-in terms, which are customizable for different events, and/or for different underlying digital assets. In this manner, artists, celebrities, or event owners, can enrich the NFT tickets by adding more underlying assets or content to the NFTs' metadata, thereby increasing the NFT tickets' value before and during the event, and increasing the residual value after the event, and by doing so without causing any potential disputes regarding respective rights of the involved parties.

Additionally, the ticket NFT smart contract can be created in a such a way as to allow customized sharing of NFT ticket sale revenue, as well as post-event secondary marketplace NFT ticket re-sale revenue at certain percentages, among multiple parties. The revenue can be shared according to contributions to the event (e.g., artist, event promoter, event venue, etc.), according to contributions to the ticket metadata (e.g., artwork, music, video clip, etc.); or according to any other pre-negotiated revenue splits.

The revenue splits can be implemented and enforced on secondary marketplaces (e.g., opensea.io) because the legal terms built in the NFTs dictate so.

When the link (baseURI) between the NFT smart contract and metadata/digital assets is changed legitimately, the present method of preserving the legal binding between an NFT and its metadata and digital asset, enables event tickets to be issued as an NFT collection by the same NFT smart contract, but with the benefit that different tiers of ticket holders can have different NFT metadata and/or underlying digital assets, even though the NFTs are minted from the same smart contract, thereby enabling the holders to still belong to the same fan community. Ticket NFT digital assets may be protected from unintended public view with CID encryption method. The digital asset CID is encrypted with an ACKCS private key, such that only the ticket NFT holder has access to the digital asset, by connecting his crypto wallet to the ACKCS platform, and/or such that the ticket NFT can be resold on the secondary market. Once resold, the new NFT holder will have access to the digital asset by connecting his crypto wallet to the ACKCS platform.

In addition, the NFT protocol supports a ticketing NFT mobile phone application used for ticket checking at event entrances. The phone App may scan information contained in a QR code or bar code that is created at the time a user minted the ticket NFT (i.e., bought the ticket), as well as the user's crypto wallet address in the user's phone that is presented at the event entrance. The QR code may include the typical event information (event name, location, date, and time), the event-specific ticket NFT smart contract address, the ticket NFT token ID, as well as the ticket NFT buyer's wallet address. The ticket NFT scanner application used by the event gate keeper, which is either a same App as the one in the user's phone, or a separate App, has access to all the above information. Even if the ticket buyer sends the NFT to another wallet address (the one the ticket buyer intends to present at the event entrance), because all the NFT's transaction history is on a public blockchain, the ticket NFT phone App will have access to this new wallet address and will be able to detect this new wallet address as the one representing the legitimate ticket holder. When the scanned information from the user presenting the ticket matches the information on the blockchain, the presented ticket is valid and the user is admitted. Otherwise, the user is rejected.

Figure 6:
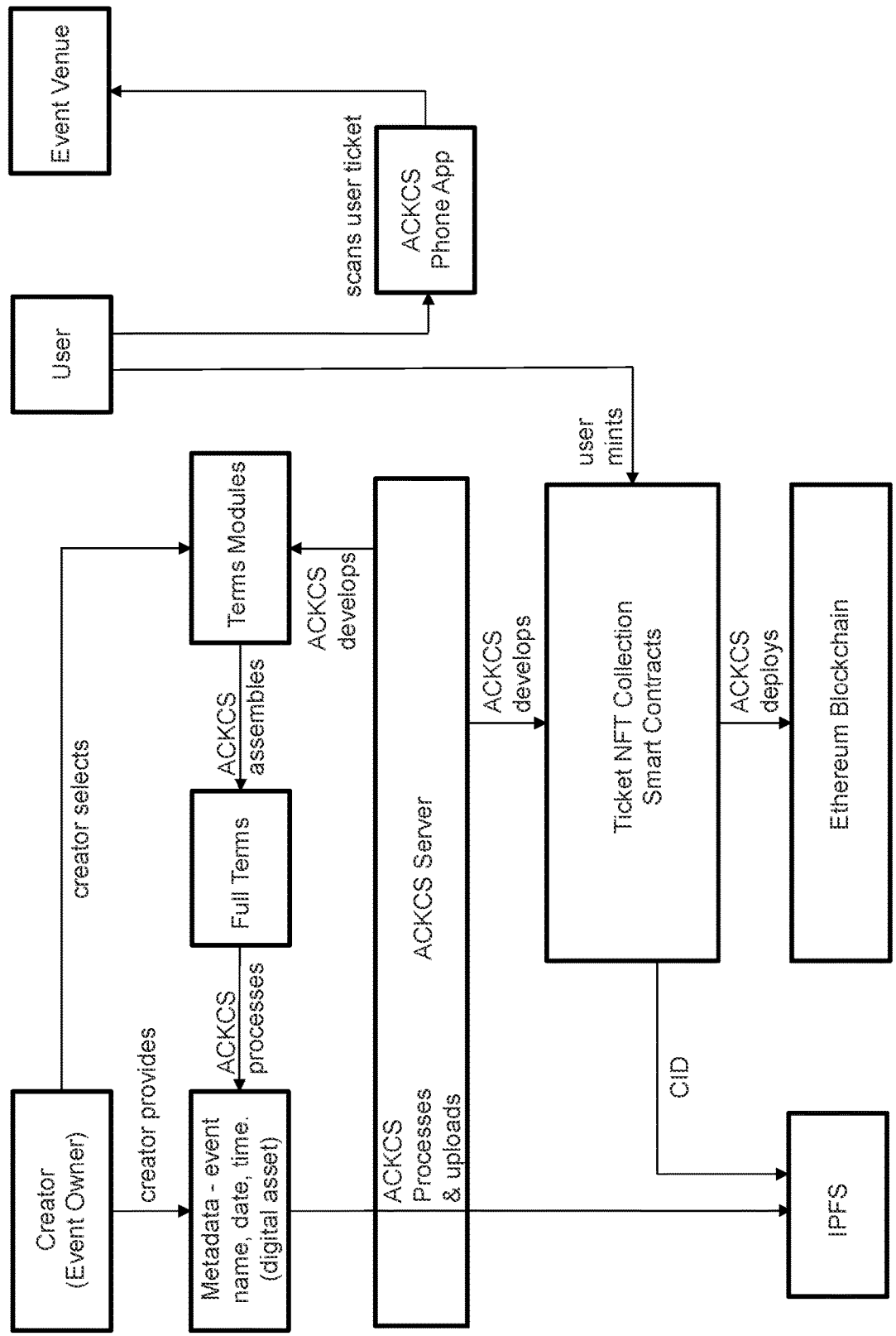
FIG. 6 shows a block diagram illustrating an example ticket NFT work flow of the new NFT protocol in accordance with various embodiments.

As a recap, FIG. 6 shows a block diagram illustrating an example ticket NFT work flow of the new NFT protocol in accordance with various embodiments. As discussed above, the creator (e.g., event owner) may provide metadata (e.g., digital file, such as event name, date, time, and optionally, one or more digital assets) to the NFT platform (e.g., ACKCS server). The creator also selects NFT terms modules. The NFT platform then assembles the full terms for the NFT (e.g., the NFT secondary file information) and adds it to the metadata of the NFT (e.g., in the Metadata JSON file and/or in the NFT secondary file information file), which are stored on a public decentralized storage system such as IPFS, along with the digital file. The NFT platform generates the ticketing NFT collection smart contracts, which is deployed to the blockchain. The user (e.g., purchaser) can then mint the ticket NFT from the ticket NFT smart contract, which is also recorded on the blockchain, and can access the Metadata (digital file or other documents) using the CID of the desired file. Importantly, the user can then access the ticketed event by presenting code information corresponding to the ticket NFT to a ticket NFT phone application operated at the venue. If the information provided via the code (e.g., visual code) matches that stored on chain, then the user is granted access to the event.

The new NFT protocol may enable fees to be exchanged as part of the ticket NFT offerings. In the above general embodiments, the user may pay a ticket price fee set by the creator plus a transaction fee (e.g., blockchain transaction fee or "gas" fee) to the NFT platform. The NFT platform may retain a protocol fee, and provide the transaction fee to the blockchain validators. The event owner may then receive an ticket NFT profit amount minus the transaction fee. Note that the event owner could be a single wallet address, or it could consist of two or more wallet addresses, such as wallet address from the artist, the event venue, and any other party who also has an interest in the event. The split of ticket profit may be based on agreement among the parties involved.

The new NFT Protocol supports a plurality of marketplace platforms and service providers (in addition to ACKCS.io). Each marketplace platform and service provider may provide an interface for creators, owners, users, and third parties such as event venues to interact with the blockchains via the new NFT protocol. As the blockchain technology and laws on which the legal terms templates are based on keep evolving, the NFT Protocol will evolve accordingly. As adoption of the protocol grows, creators, owners, users, third parties, and many entities who build on the new NFT protocol will form a vibrate ecosystem, powering and thriving in the Web3 economy based on NFTs with built-in terms.

Figure 7:
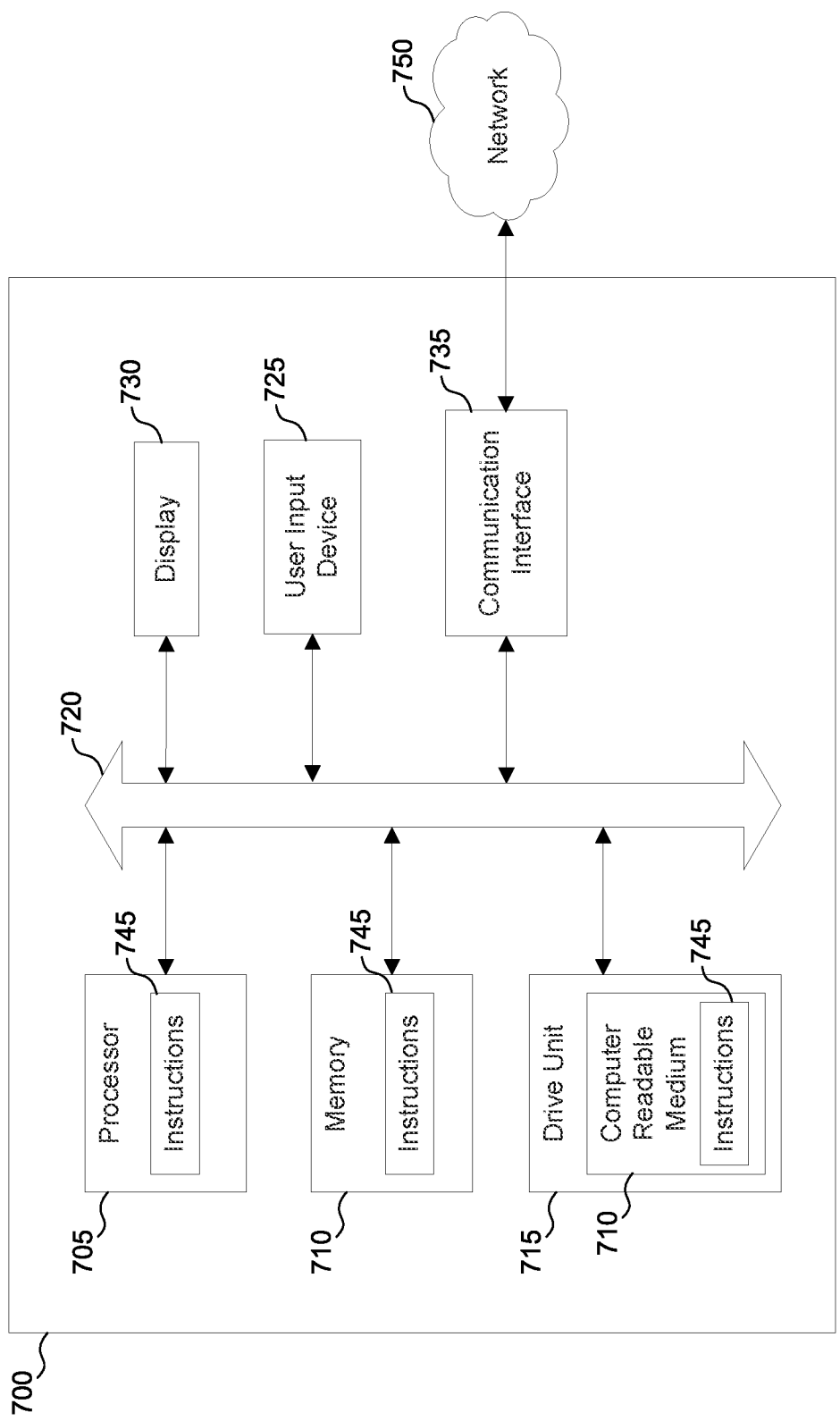
FIG. 7 illustrates an exemplary computer system that may form part of or implement the methods and systems described in the figures or in the following paragraphs.

In various embodiments, the NFT platform may comprise a computing device or collection of computing devices, such as computers or servers. Similarly, user devices that interact with the NFT platform, such as computers or mobile devices, may also comprise computing devices. FIG. 7 illustrates an example architecture of a computer system 700 that may form part of or implement the various systems described above (for example, the servers and computers of the NFT Platform, user devices, or mobile devices). The computer system 700 may include a set of instructions 745 that the processor 705 may execute to cause the computer system 700 to perform any of the operations or methods described above. The computer system 700 may operate as a stand-alone device or may be connected, e.g., using a network, to other computer systems or peripheral devices.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a server or a personal computer, and be capable of executing the instructions 645 (sequential or otherwise) that specify actions to be taken by that machine. Further, each of the systems described may include any collection of subsystems that individually or jointly execute a set, or multiple sets, of instructions to perform one or more computer functions.

The computer system 700 may include one or more memory devices 710 on a bus 720 for communicating information. In addition, code or instructions operable to cause the computer system 700 to perform any of the operations and/or methods described above may be stored in the memory 710. The memory 710 may be a random-access memory, read-only memory, programmable memory, hard disk drive or any other type of memory or storage device.

In some systems, the computer system 700 may include a display 730, such as an LED display, a liquid crystal display (LCD), or any other display suitable for conveying information. The display 730 may act as an interface for the user to see the functioning of the processor 705, or specifically as an interface with the software stored in the memory 710 or in a drive unit 715.

Additionally, in various systems, the computer system 700 may include an input device 725, such as a keyboard, a mouse, a touchpad, a touchscreen, buttons, actuators, cameras, and microphones, configured to allow a user to interact with various components of system 700.

In various systems, the computer system 700 may also include a disk or optical drive unit 715. The disk drive unit 715 may include a computer-readable medium 740 in which the instructions 745 may be stored. The instructions 745 may reside completely, or at least partially, within the memory 710 and/or within the processor 705 during execution by the computer system 700. The instructions 745, when executed by the processor 705, may cause the processor 705 to perform any of the operations and/or methods discussed herein. The memory 710 and the processor 705 also may include computer-readable media as discussed above.

The computer system 700 may include a communication interface 735 to support communications via a communication network 750. The network 750 may include wired networks, wireless networks, or combinations thereof. The communication interface 735 network may enable communications via any number of communication standards, such as 802.11, 802.12, 802.20, WiMAX, cellular telephone standards, Bluetooth, or other communication standards. In various approaches, the communication interface 735 may comprise the input devices 725 (e.g., a camera) and the display 730 as devices that enable communication with the computer system 700.

The methods and systems discussed above may be realized in hardware, software, or a combination of hardware and software. The methods and systems may be realized in a centralized fashion in at least one computer system or in a distributed fashion where different elements are spread across several interconnected computer systems. Any kind of computer system or other apparatus adapted for carrying out the methods described herein may be employed.

The methods and systems may also be embedded in a non-transitory computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The disclosed NFT Protocol and NFT platform provide an infrastructure where NFTs are created with built-in terms, and content encryption when applicable, which enables creation of digital asset marketplaces and service platforms for the Web3 era, where sellers know exactly what they are selling, and buyers know exactly what rights they will have, with the terms located in a decentralized network, transparently and permanently linked to the NFTs, eliminating any confusions between the owner, the buyer, and subsequent owners. The NFT platform built on this new NFT protocol enables streaming services for artwork, music, movies, and videos, software licensing, event ticketing, and physical assets tokenization and trading, where settlement is peer-to-peer, immediate, immutable, and transparent on the blockchain. It empowers creators and owners economically by eliminating the middleman, while providing millions of people around the world access to a variety of events, memberships, and digital assets. With built-in terms and content encryption as the solid foundation, the Web3 economy can thrive on the many possibilities brought by the blockchain and NFT technology.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation/example/approach" as used herein does not necessarily refer to the same embodiment and the phrase "in another embodiment/implementation/example/approach" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

I claim:

1. A method of creating a non-fungible token (NFT) that prevents changing of a digital file to which the NFT relates after the NFT is minted, comprising:
   generating, by an NFT platform, NFT secondary file information relating to the digital file and the NFT, wherein the NFT secondary file information comprises a content ID of the digital file stored in a data storage, wherein the data storage is a permanent and immutable data storage;
   generating, by the NFT platform, an NFT metadata file comprising the content ID of the digital file stored in the data storage;
   storing, by the NFT platform, the NFT metadata file and the NFT secondary file information in the data storage;
   generating a smart contract of the NFT comprising a link to a content ID of the NFT metadata file stored in the data storage;
   deploying the smart contact, by the NFT platform, to a distributed ledger system;
   receiving an indicated date or NFT TokenID number after which at least one of the NFT metadata file, the NFT secondary file information, or the digital file is to be changed;
   generating, by the NFT platform, updated NFT secondary file information relating to the digital file or an updated digital file, wherein the updated NFT secondary file information comprises the content ID of the digital file or an updated content ID of an updated digital file;
   generating, by the NFT platform, an updated NFT metadata file comprising the content ID of the digital file or the updated content ID of the updated digital file;
   storing, by the NFT platform, the updated NFT metadata file and the updated NFT secondary file information in the data storage; and
   causing the smart contract of the NFT to include a link to an updated content ID of the updated NFT metadata file.

2. The method according to claim 1, comprising:
   storing the NFT secondary file information in an NFT secondary file information file that is a separate file from the NFT metadata file,
   wherein the NFT metadata file comprises a content ID of the digital file and a content ID of the NFT secondary file information file.

3. The method according to claim 1, comprising:
   storing the NFT secondary file information in the NFT metadata file.

4. The method according to claim 1,
   wherein the NFT secondary file information also includes at least one of:
   a description of the NFT;
   a smart contract owner wallet address;
   an NFT timestamp;
   NFT terms; and/or
   an NFT platform stamp or serial number.

5. The method according to claim 1,
   wherein the permeant and immutable data storage is a public decentralized storage system.

6. The method according to claim 5,
   wherein the public decentralized storage system is an InterPlanetary File System (IPFS).

7. The method according to claim 1,
   wherein the digital file is at least one of an image file, an audio file, a video file, a document file, an application, or a software key.

8. The method according to claim 1, comprising:
   receiving, by the NFT platform, the digital file; and
   storing, by the NFT platform, the digital file in the data storage.

9. The method according to claim 1, comprising:
   receiving selections of template NFT terms; and
   generating the NFT secondary file information based at least in part on the selections.

10. The method according to claim 1,
    wherein the NFT secondary file information also includes an NFT platform stamp or serial number.

11. The method according to claim 1, wherein the digital file is a first digital file, the method comprising:
    encrypting a content ID of a second digital file stored in the data storage to form an encrypted content ID, wherein the second digital file is related to the first digital file; and
    generating the NFT metadata file comprising the encrypted content ID of the second digital file.

12. The method according to claim 11, wherein the first digital file is at least one of:
    a lower resolution version of the second digital file;
    an incomplete portion of the second digital file; and/or
    an image corresponding to the second digital file when the second digital file is a video file or an audio file.

13. The method according to claim 11,
    wherein encrypting the content ID of the second digital file to form the encrypted content ID comprises encrypting the content ID of the second digital file using a cryptographic key of an issuer of the NFT and a cryptographic key of the NFT platform.

14. The method according to claim 13, comprising:
generating the NFT secondary file information comprising the encrypted content ID of the second digital file.

15. The method according to claim 11,
wherein encrypting the content ID of the second digital file to form the encrypted content ID comprises encrypting the content ID of the second digital file using a cryptographic key of a streaming user of the second digital file and a cryptographic key of the NFT platform.

16. The method according to claim 15, comprising:
decrypting, by the NFT platform, the encrypted content ID of the second digital file stored in the data storage using the cryptographic key of the streaming user and the cryptographic key of the NFT platform;
retrieving, by the NFT platform, the second digital file from the data storage; and
streaming, by the NFT platform, the second digital file to the streaming user.

17. The method according to claim 1,
wherein the NFT represents a license to use a software application, and
wherein generating the smart contract comprises generating the smart contract comprising an NFT expiration time and instructions for the NFT to self-destruct upon reaching the expiration time.

18. The method according to claim 1, wherein the NFT represents a ticket to an event, the method comprising:
generating a code corresponding to the NFT at a time of minting the NFT, the code representing an address of the smart contract and a token ID of the NFT.

19. The method according to claim 18, comprising:
presenting, by a first mobile device, the code and information corresponding to a wallet address of a present holder of the NFT;
scanning, by a second mobile device, the code presented by the first mobile device and the information corresponding to the wallet address of the present holder of the NFT; and
determining that the address of the smart contract, the token ID of the NFT and the information corresponding to the wallet address of the present holder of the NFT match data on the distributed ledger system.

20. The method according to claim 18, comprising:
encrypting the content ID of the digital file to form an encrypted content ID using a cryptographic key of the NFT platform.

* * * * *